(12) United States Patent
Torii

(10) Patent No.: US 6,330,661 B1
(45) Date of Patent: Dec. 11, 2001

(54) REDUCING INHERITED LOGICAL TO PHYSICAL REGISTER MAPPING INFORMATION BETWEEN TASKS IN MULTITHREAD SYSTEM USING REGISTER GROUP IDENTIFIER

(75) Inventor: Sunao Torii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/298,978

(22) Filed: Apr. 26, 1999

(30) Foreign Application Priority Data

Apr. 28, 1998 (JP) .................................................. 10-117666
Jan. 6, 1999 (JP) .................................................. 11-000819

(51) Int. Cl.$^7$ ...................................................... G06F 9/54
(52) U.S. Cl. ............................. 712/228; 712/23; 709/108
(58) Field of Search ....................... 712/23, 228; 709/108

(56) References Cited

U.S. PATENT DOCUMENTS

| | | | |
|---|---|---|---|
| 5,913,059 | 6/1999 | Torii ..................................... | 709/104 |
| 5,996,068 | * 11/1999 | Dwyer, III et al. .................. | 712/228 |
| 6,092,175 | * 7/2000 | Levy et al. .............................. | 712/23 |

FOREIGN PATENT DOCUMENTS

| | | |
|---|---|---|
| 10-78880 A | 3/1998 | (JP) . |
| WO 91/10194 | 7/1991 | (WO) . |
| WO 92/03794 | 3/1992 | (WO) . |

OTHER PUBLICATIONS

Sohi et al.; The 22nd Annual International Symposium on Computer Architecture; "Multiscalar Processors"; dated Jun. 22–24, 1995; pp. 414–425.

Torii et al.; JSPP '97 Joint Symposium on Parallel Processing 1997; "Control Panel On–Chip Multi–Processor: MUSCAT"; dated May 28, 1997; pp. 229–236.

* cited by examiner

*Primary Examiner*—Kenneth S. Kim
(74) *Attorney, Agent, or Firm*—McGinn & Gibb, PLLC

(57) ABSTRACT

A register content inheriting system contributes for realization of register content inheriting with a hardware of simple construction in a multithread multi-processor. Respective thread execution units and physical common register are provided. Using a register mapping table, a register number to be made reference to from each program is placed in the physical common register. Only as required in inheriting of register content, a relationship of the register mapping table is updated. Upon inheriting the content of the register, the content of the register mapping table is copied.

16 Claims, 26 Drawing Sheets

FIG.6

REGISTER MAPPING TABLE

| | GROUP SELECTION BIT | ON-INHERITING GROUP SELECTION BIT | A | | | B | | |
|---|---|---|---|---|---|---|---|---|
| | | | PHYSICAL EXPANSION BIT | MODIFY | WRITE BACK | PHYSICAL EXPANSION BIT | MODIFY | WRITE BACK |
| r0 | | | | | | | | |
| r1 | | | | | | | | |
| r2 | | | | | | | | |
| r3 | | | | | | | | |
| --- | --- | --- | --- | --- | --- | --- | --- | --- |
| r31 | | | | | | | | |
| | 41 | 42 | 43 | 44 | 45 | | | |

| UNIT #(n-1) EFFECTIVE INPUT | COMPLETIVE WRITE | MODIFY | COMPLETIVE WRITE | MODIFY | SELECTION UPON FORK | UNIT #(n+1) EFFECTIVE INPUT |
|---|---|---|---|---|---|---|
| EFFECTIVE | 0 | 0 | * | * | A | EFFECTIVE |
| NULL | 0 | 0 | * | * | A | NULL |
| EFFECTIVE | * | * | 0 | 0 | B | EFFECTIVE |
| NULL | * | * | 0 | 0 | B | NULL |
| * | 1 | 1 | * | * | A | NULL |
| * | 0 | 1 | * | * | A | EFFECTIVE |
| * | * | * | 1 | 1 | B | NULL |
| * | * | * | 0 | 1 | B | EFFECTIVE |

REDUCING INHERITED LOGICAL TO PHYSICAL REGISTER MAPPING INFORMATION BETWEEN TASKS IN MULTITHREAD SYSTEM USING REGISTER GROUP IDENTIFIER

BACKGROUND OF THE INVENTION

1. Field of the Invention

The present invention relates generally to a register content inheriting system in a multi-processor. More particularly, the invention relates to a multithread microprocessor executing a plurality of instructions simultaneously.

2. Description of the Related Art

As a technology for speeding-up a program, there has been proposed a system for performing a parallel processing through a thread by dividing the program into a plurality of threads. Adapting to such thread level parallel processing, study for the processors have been progressed. The thread level parallel processing system takes a method to improve a processing speed with improving use efficiency of an arithmetic unit by executing a plurality of threads simultaneously instead of parallel characteristics of the instruction unit.

Such thread level parallel processing can be classified to one no dependency between the threads with each other for some problems to be solved at all, one having low dependency and whereby having less problem in performance even when dependency is resolved by a software and one having high dependency and thus requiring execution aid of thread level parallel processing by hardware.

When there is no dependency between the threads or when dependency between threads is low and thread is large, gain by parallel processing may be higher than an overhead of thread management by a software. Therefore, a support in a hardware can be restricted to be minimum.

However, in certain problem to be solved, dependency can become high or thread per se becomes small, some hardware support becomes necessary.

Upon speeding up of fine thread, efficient thread generation and data transfer between the threads are inherent. For example, as one example of a parallel processing multiprocessor of fine threads has been disclosed "Multiscalar Processor (Gurinder S. Sohi, Scott E. Breach and T. N. Vijaykumar, The 22ns International Symposium on Computer Architecture, IEEE Computer Society Press, 1995, pp 414–425.

In Multiscalar Processor, a single program is divided into "tasks" as aggregate of basic blocks, and the "tasks" are processed by a processor which can executes those tasks in parallel. Transfer of register contents between "tasks" is designated by a task descriptor generated by a task compiler.

In the task descriptor, a register which may be generated is explicitly designated. This designation is referred to as create mask. On the other hand, for an instruction updating the register finally designated by the create mask, a forward bit is added. Thus, multiscalar processor performs parallel execution by a code depending upon decoding ability of the compiler.

One example of a construction of the multiscalar processor is shown in FIG. 24. In FIG. 24, the multiscalar processor is constructed with a sequencer 6, processing units 7-1 to 7-3, an associative network 8 and data banks 9-1 to 9-3.

Each of a plurality of the processing units 7-1 to 7-3 in the system is constructed with a cache 71, an execution unit 72 and a register file. On the other hand, corresponding to the processing units 7-1 to 7-3, a plurality of data banks 9-1 to 9-3 are provided. Each of the data banks 9-1 to 9-3 is constructed with an address resolution buffer (ARB) and data cache 91.

Management of simultaneous execution of a plurality of tasks is performed by the sequencer 6 which assigns task to the processing units 7-1 to 7-3. The content of each register of the register file is forwarded at a timing of data generation by designation of task descriptor.

On the other hand, in "Proposal for Directivity Control Parallel Architecture of On-chip Multiprocessor (MUSCAT)", (Torii, Kondo, Motomura, Konagaya, Nishi, JSPP 97, pp 229 to 236, May 1997), there has been proposed a fork one time model limiting the fork for only one time during a thread life period is a period, in which one thread generates a thread by a fork instruction, and a thread execution model, performing lamp inheriting of all registers of the register file upon thread generation.

An image of the fork one time model is shown in FIG. 23. The fork one time model generates new thread for only one time during life period of the threads #1 to #3. By introduction of this model, simplification of thread management can be realized.

Furthermore, in a technology disclosed in Japanese Unexamined Patent Publication No. 10-078880, several kinds of methods for realizing register inheriting method by the fork one time model has been disclosed. Among these inheriting method, most of the method employs a method to finally copy the register content while timings are different. However, copying of the register content causes increasing of physical amount and hindering of speeding up.

Therefore, in the technology disclosed in the above-identified Japanese Unexamined Patent Publication No. 10-078880, there has been proposed an example, realizing inheriting of the register content by providing common registers with separating the register into logical registers and physical registers and only mapping image indicative of relationship between the logical register and the physical register is copied, as out-to-order issuing system, in which instructions are issues in non-order irrespective of the program order.

An example of the construction of the processor of this type is shown in FIG. 25. In FIG. 25, there is shown a construction of a two thread parallel execution type processor which is constructed with a common physical register file 126 common to thread execution units 121a and 121b, a register busy table 129, a register free table 130 and a thread management unit 131.

Each of the thread execution units 121a and 121b is constructed with instruction caches 122a and 122b, instruction decoders 123a and 123b, register mapping tables 124a and 124b, instruction queues 125a and 125b, arithmetic units 127a and 127b and effective instruction order buffers 128a and 128b.

In the shown processor, the register is separated into a logical register to be accessed from the software and a physical register holding a register content in hardware, and a mapping relationship is held in the register mapping tables 124a and 124b.

Detailed construction of the register mapping tables 124a and 124b is shown in FIG. 26. In FIG. 26, the register mapping tables 124a and 124b has a physical register number entry of registers 0 to 31 to convert into register numbers "45", "13", "04", "21", -, "53".

Upon generation of the thread, by copying the mapping information between the register mapping tables 124a and 124*b*, register inheriting is realized without performing copy of the register content.

In the foregoing conventional multithread microprocessor, in case of the in-order issuing type in the register inheriting system of the register, in the above-mentioned publication, it becomes necessary to copy the content of the register upon initiation of the thread and termination of the thread.

On the other hand, in case of the out-of-order issuing type, copying of the register content becomes unnecessary. However, a common register free table between the thread execution units indicative of use/non-use of the register becomes necessary to cause a problem of complication of logic and data path and increasing of data amount. On the other hand, register renaming per one instruction is required to be too wasteful in application for the in-order issuing type.

SUMMARY OF THE INVENTION

Therefore, the present invention has been worked out for solving the problems set forth above. It is an object of the present invention to provide a register content inheriting system in a multi-processor which can achieve high efficiency both for in-order issuing type and out-of-order issuing type and high performance for fine threads. In order to accomplish the above-mentioned and other objects, according to one aspect of the present invention, a register content inheriting system in a multi-processor logically having a plurality of program counters and the multi-processor including a plurality of thread execution units simultaneously fetching, decoding and executing a plurality of threads according to the plurality of program counters, comprises:

a physical common register file common between respective of the plurality of thread execution units and consisted of a plurality of physical registers;

a conversion table provided for each of the plurality of thread execution units and defining a mapping relationship between one logical register in the thread execution unit and particular one of the plurality of physical registers in the physical common register file;

means for copying information of the conversion table of each of the plurality of thread execution units to an adjacent thread execution unit, group being established per a plurality of physical registers, in which the mapping relationship is defined between one logical register, and information indicative of position within each group being added to the information of the conversion table for defining the mapping relationship.

Namely, the register content inheriting system in the multi-processor according to the present invention is provided with a constraint in assignment relationship between the logical register and the physical common register file in order to accomplish the object set forth above.

This is the constraint that the physical common register file is divided into groups in number corresponding to number of the physical registers, and the physical register is assigned to the physical register belonging in one group of the physical common register file in mapped relationship.

The mapped relationship is a pointer information indicative where the physical register is arranged in the physical register file. Upon inheriting the content of the register, the pointer is copied to advance the mapping pointer only once upon updating of the register by the thread after inheriting for realizing independent operation after generation of inheriting of the register content upon thread generation.

By this, without performing copying of the content of the register, high performance can be achieved in high efficiency and fine thread either in in-order issuing type and out-of-order issuing type.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 6 is an illustration showing a detailed construction of a register mapping table of FIG. 2;

FIG. 16 is an illustration showing a detailed construction of the register mapping table of FIG. 15;

FIG. 20 is an illustration showing an effective/null determination logic in the register effectiveness table shown in FIG. 17;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
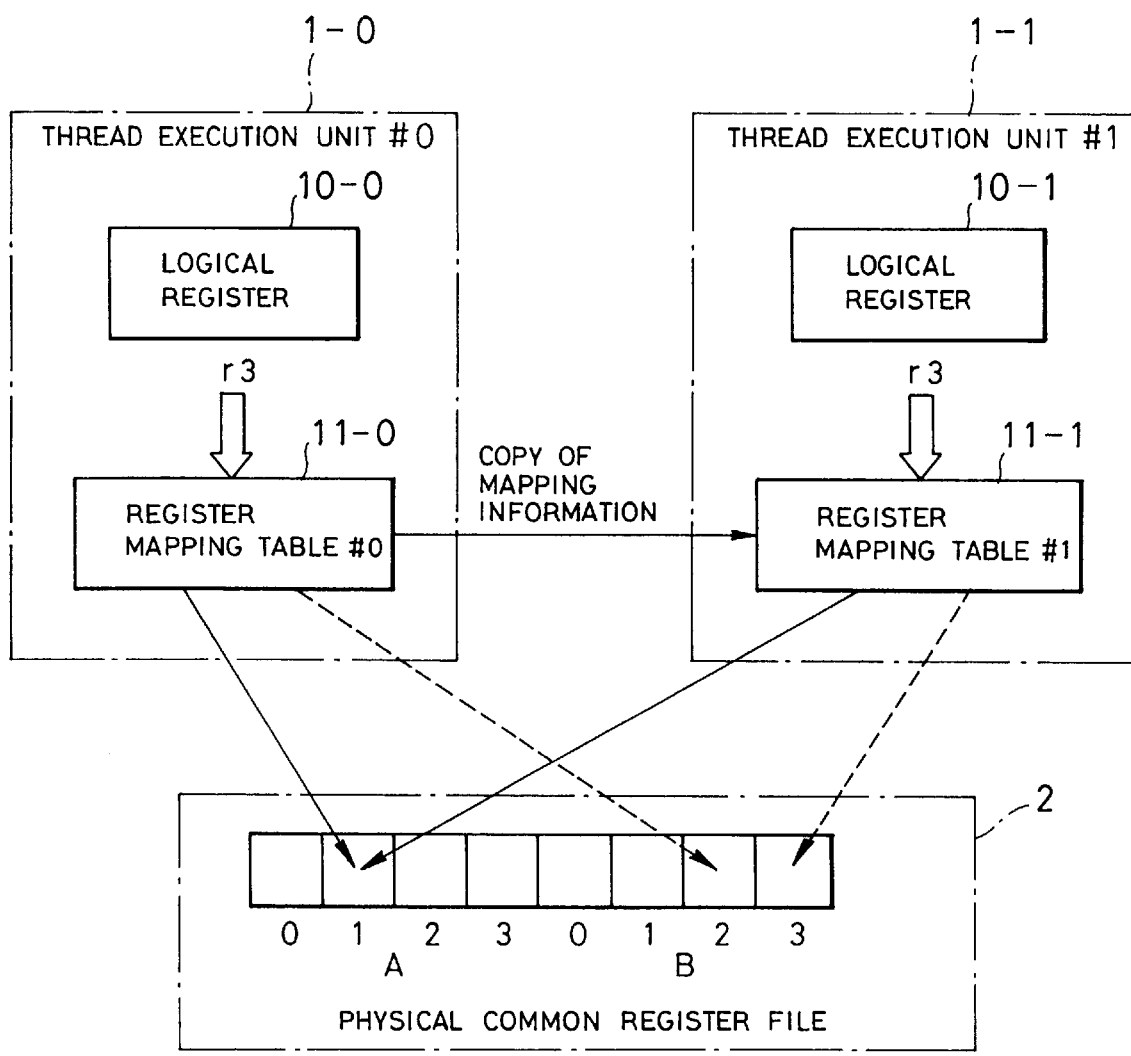
FIG. 1 is an illustration showing a basic concept of the first embodiment of a register content inheriting system in a multi-processor according to the present invention.

FIG. 1 is an illustration showing a basic concept of the first embodiment of a register content inheriting system in a multi-processor according to the present invention. In FIG. 1, for a logical register 10-0 to be used from a program on a thread executing unit (#0) 1-0 and for a logical register 10-1 to be used from a program on a thread executing unit (#1) 1-1, entries in a physical common register are assigned. Then, inheriting of the thread of the register is achieved without copying the real value of the registers by copying the assignment mapping information between the register mapping table (#0) 11-0 of the thread executing unit (#0) 1-0 and the register mapping table (#1) 11-1 of the thread executing unit (#1) 1-1.

Figure 2:
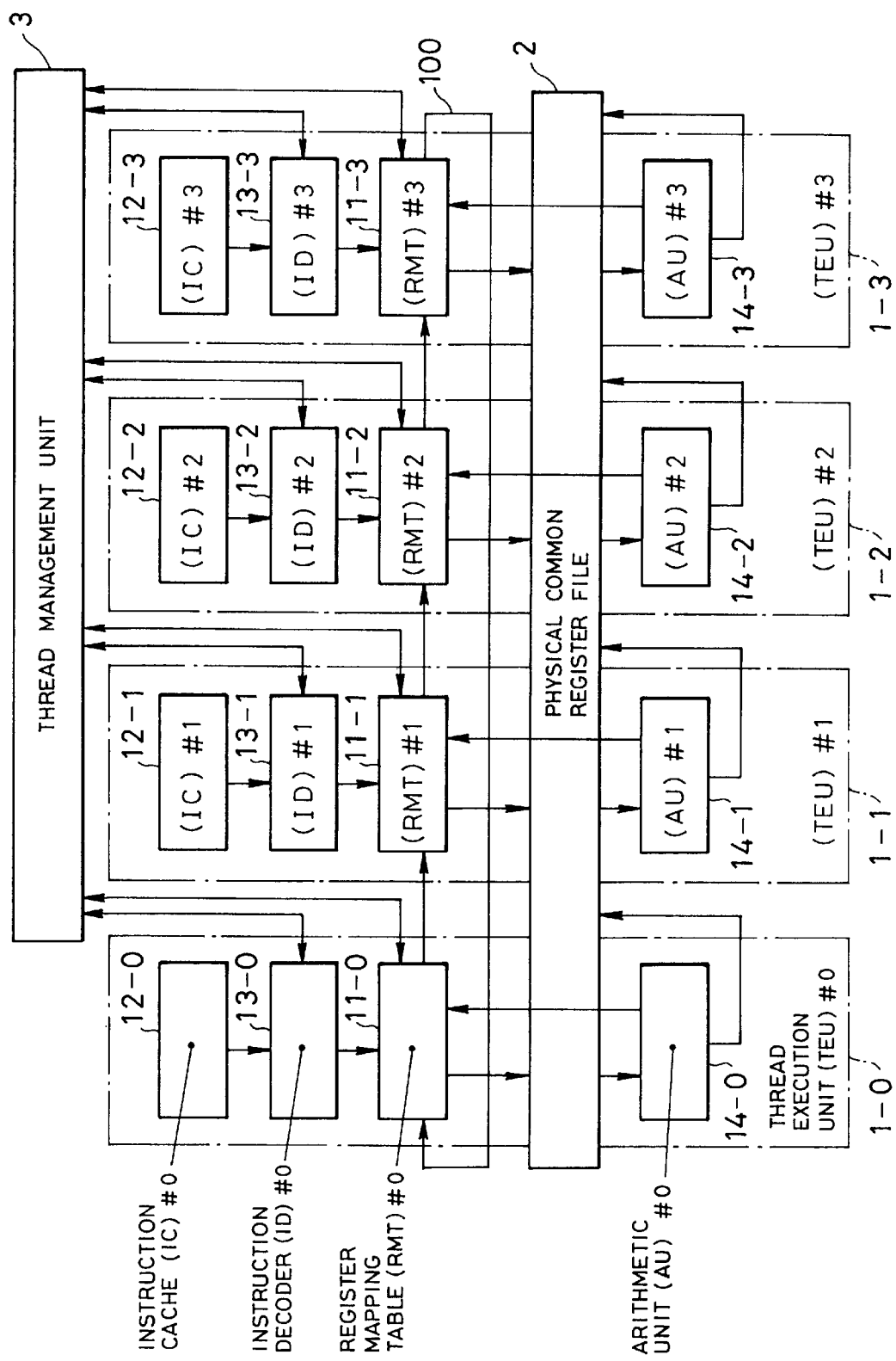
FIG. 2 is a block diagram showing one embodiment of the register content inheriting system in the multi-processor according to the present invention.

FIG. 2 is a block diagram showing a construction of the first embodiment of the register content inheriting system in the multi-processor according the present invention. It should be noted that FIG. 2 shows a four thread parallel execution type multi-processor.

The multi-processor includes four sets of thread executing units (#0 to #3) 1-0 to 1-3, and a physical common register file 2.

Respective of the thread executing units 1-0 to 1-3 include instruction caches (#0 to #3) 12-0 to 12-3, instruction decoders (#0 to #0) 13-0 to 13-3, register mapping tables (#0 to #3) 11-0 to 11-3, and arithmetic units (#0 to #3) 14-0 to 14-3.

On the other hand, the register mapping tables 11-0 to 11-3 are connected with adjacent register mapping tables 11-0 to 11-3 for forming a ring form by a mapping information transfer bus 100. The multi-processor further requires a load store unit, data cache memory, external interface and so forth in addition to the foregoing construction. However, since such additional components are not directly relevant for the present invention, those components will be neglected from disclosure and illustration on the drawings.

Figure 3:
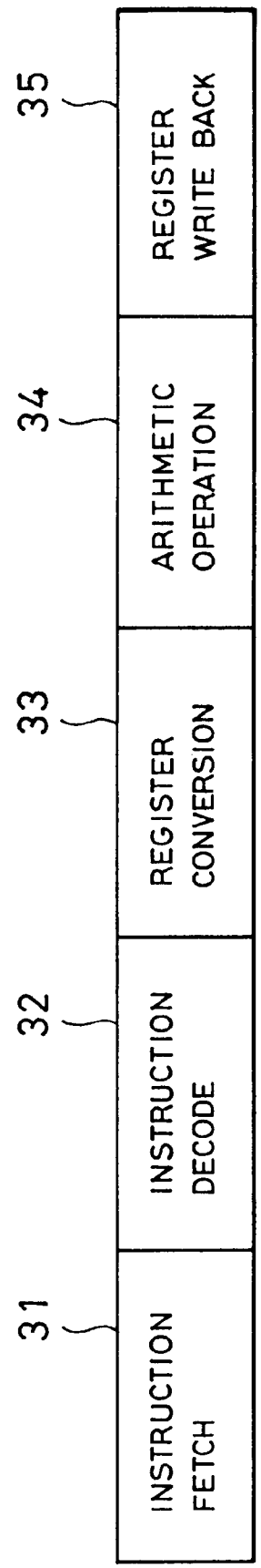
FIG. 3 is an illustration showing a pipeline stage in each thread execution unit of FIG. 2.

FIG. 3 is an illustration showing a pipeline stage of each thread execution unit 1-0 to 1-3. In FIG. 3, in the pipeline state in each thread executing unit 1-0 to 1-3, execution of instruction is completed through 5 stages consisted of an instruction fetching stage 31, an instruction decoding stage 32, a register converting stage 33, an arithmetic stage 34, a register writing back stage 35.

Figure 4:
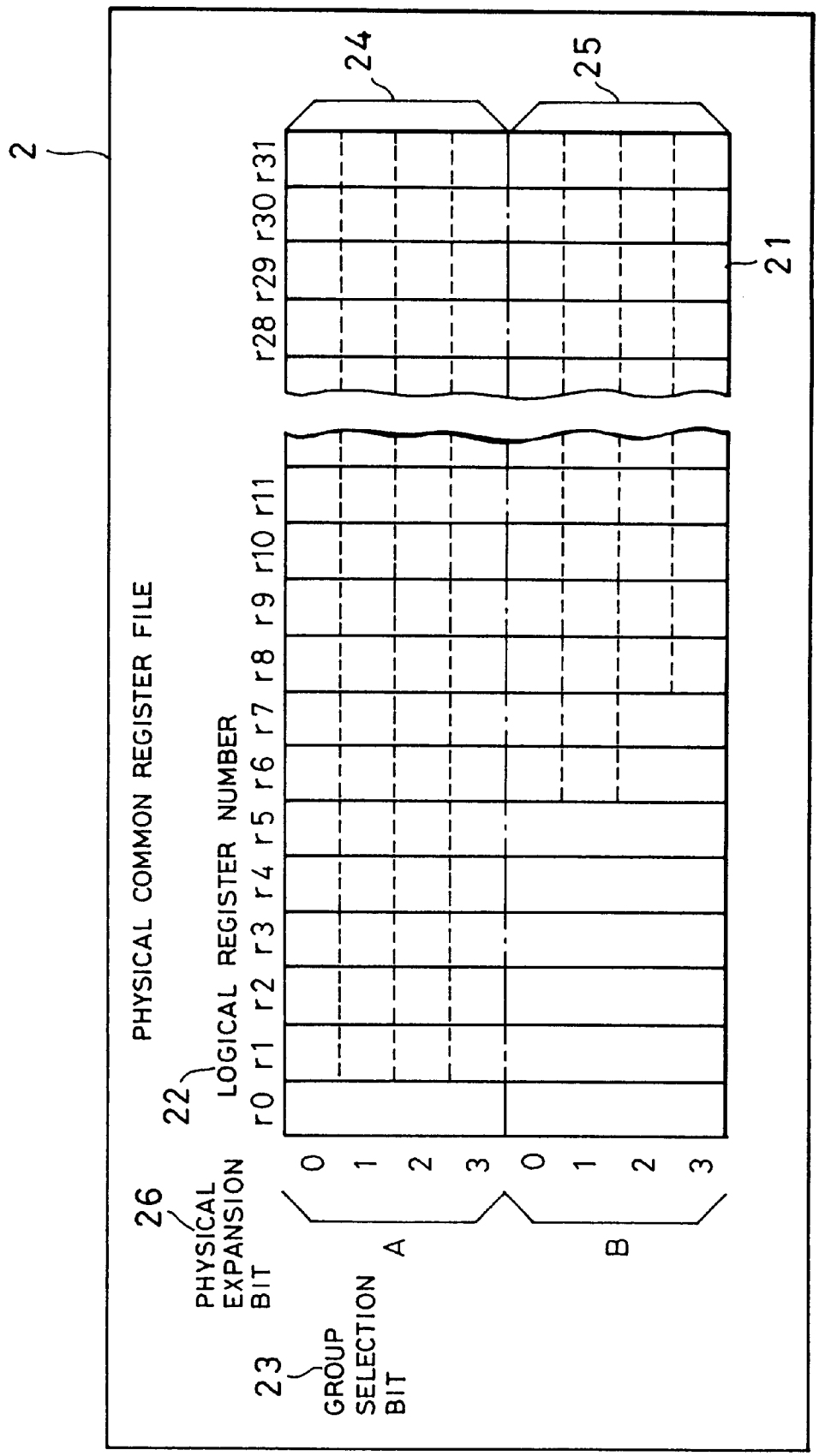
FIG. 4 is an illustration showing a construction showing a detail of a physical common register file of FIG. 2.

FIG. 4 is an illustration showing a detailed construction of the physical common register file 2 of FIG. 2. The physical register file 2 is constructed with physical registers 21 in number of double of the number of the thread executing units 11-0 to 11-3 per each logical register number 22. Accordingly, in the shown embodiment, for one logical register, eight logical registers 21 are corresponded.

Each physical register 21 is divided into two groups 24 and 25 of A and B of group selection bits 23 and had physical expansion bits 26 in number corresponding to the number of the thread execution units 11-0 to 11-3.

Figure 5:
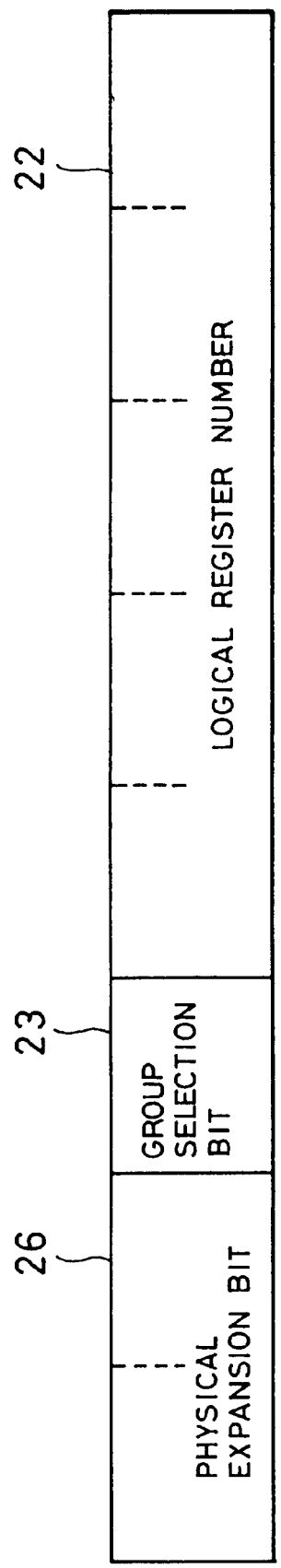
FIG. 5 is an illustration showing a format of a physical register of FIG. 4.

FIG. 5 is an illustration showing a format of the physical register 21 of FIG. 4. In FIG. 5, when the physical register 21 is an instruction set having thirty-two logical register set, it is constituted of the physical expansion bits 26, the group selection bits 23 and the logical register number 22. In this case, when the number of the logical register sets is varied, the bit number indicative of the logical register number 22 is varied, and when the number of the thread executing unit 1-0 to 1-3 is varied, the value of the physical expansion bit 26 is varied.

FIG. 6 is an illustration showing a detailed construction of the register mapping table 11 of FIG. 2. In FIG. 6, the register mapping table 11 is divided into groups A and B selected by the group selection bit 41 per logical register number 22. The register mapping table 11 is consisted of a physical expansion bit 43, a modification bit 44, a write back bit 45 and a on-inherit group selection bit 22.

The group selection bit 41 represents a group of the common physical register file 2 which is made reference to by the thread execution units 1-0 to 1-3, and which of the physical register 21 therein is to be made reference to, is indicated by the physical expansion bit 43.

The modification bit 44 represents whether the instruction for updating the physical register 21 selected by the group selection bit 41 is decoded for one or more times by the thread execution unit 1-0 to 1-3, or not.

The write back bit 45 represents whether one ore more instruction updating the physical register 21 has been actually completed or not. The on-inheriting group selection bit 42 is one for which the content of the group selection bit 41 is copied at a timing where the register content is inheritred from one thread execution unit 1-0 to 1-3 from the other thread execution unit 1-0 to 1-3.

Figure 7:
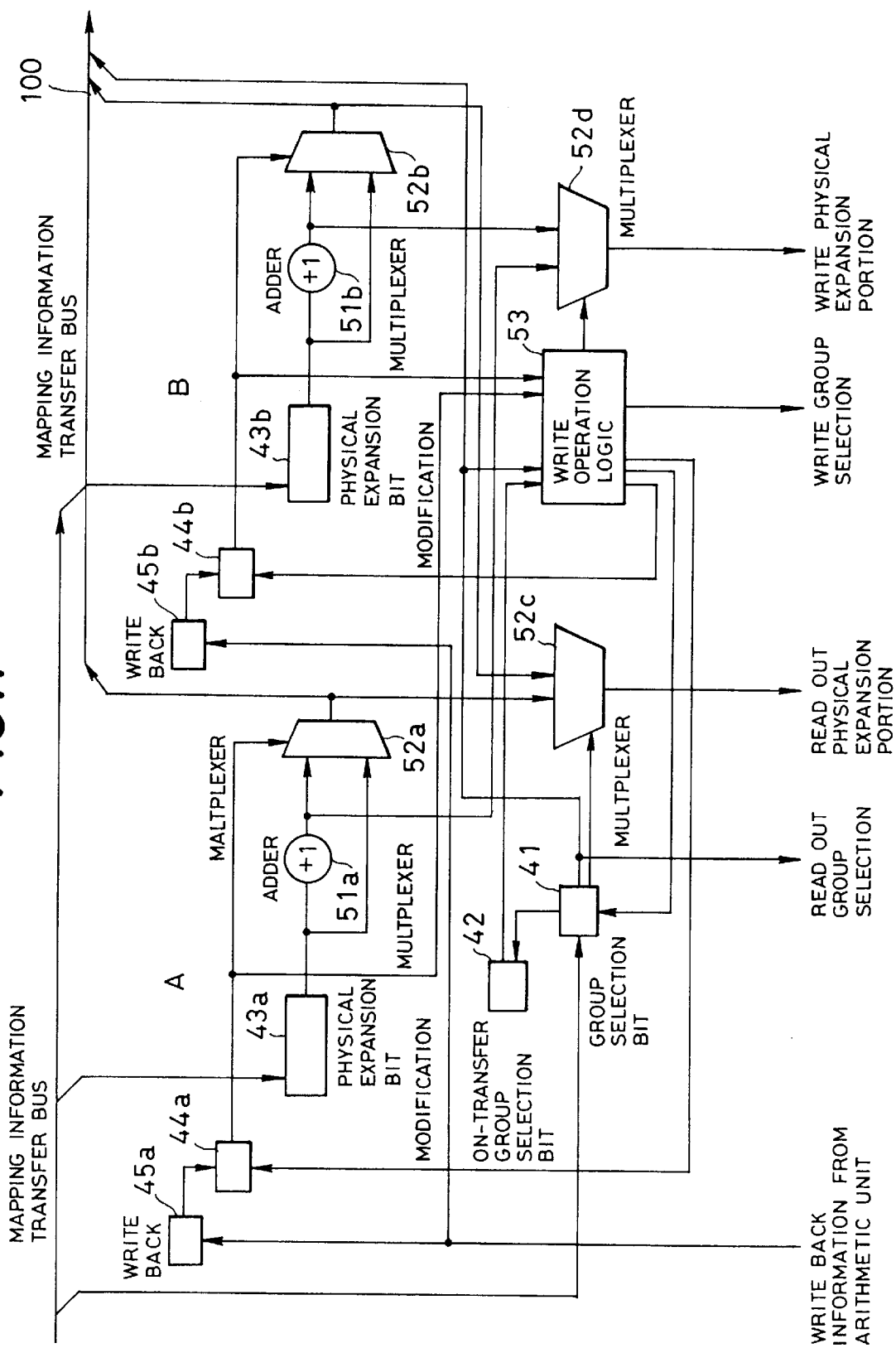
FIG. 7 is an illustration showing a detailed construction of one entry of the register mapping table of FIG. 2.

FIG. 7 is an illustration showing a detailed construction of one entry of the register mapping table 11 of FIG. 2. In FIG. 7, the register mapping table 11 is provided with adders 51a and 51b, multiplexers 52a to 52d, and a write operation logic 53 in addition to the bits shown in FIG. 6.

The group selection bit 41 is set when a fork in fork one time model is modified, namely when the register value is modified for the first time by the instruction of the thread execution unit 1-0 to 1-3 after performing thread generation.

Judgment whether re-writing is the first time after fork or not is performed based on an exclusive OR of the values of the group selection bit 41 and the on-inherit group selection bit 42. The on-inheriting group selection bit 42 can perform judgment for holding the copy of the group selection bit 41 upon thread generation.

On the other hand, the modification bits 44a and 44b are reset the group side selected by the group selection bit 41 upon initiation of own thread and set the non-selected side group. Subsequently, when the instruction for modifying the register value is received from the instruction decoder 13, modification bits 44a and 44b on the side selected by the group selection bit 41 are set.

The write back bits 45a and 45b is reset on the side selected by the group selection bit 41 and set on the on-selected side, upon initiation of own thread. The write back bits 45a and 45b which is in reset is set when the result actually calculated by the arithmetic unit 14 is written back to the physical common register file 2.

By this, expansion of the physical register number is performed for the physical register 10 according to a principle of making reference set forth below. At first, upon reading reference, the multiplexers 52a and 52b directly outputs the values of the physical expansion bits 43a and 43b when the modification bits 44a and 44b are reset, and outputs values derived by adding one to the values of the physical expansion bits 43a and 43b by the adders 51a and 51b, when the modification bits 44a and 44b are set.

By adding one to the values of the physical expansion bits 43a and 43b, conflict of register in the physical common register file 2 to be used on the non-selected side is avoided. Since the non-selected side is used upon modification in own unit, prevention of occurrence of conflict of the registers can be realized by preventing use of the same register in the unit of the preceding stage and the own unit or in the unit of the following stage and the own unit.

The multiplexer 52c selects out one of the values of the A group and B group to read out to output as the physical expansion bit 26 for reference depending upon the group selection bit 41.

On the other hand, the physical expansion bit 26 for writing reference is required to constantly output the value derived by adding one to the values of the physical expansion bits 43a and 43b irrespective of selection of the group between the A group and B group.

Accordingly, as input for the multiplexer 52d, a value derived through the adders 51a and 51b from the physical expansion bits 43a and 43b in either of A group and B group. Selection of the A group or B group is basically performed according to the value of the group selection bit 41. However, upon switching the group selection bit 41 set forth above, precedingly switched one is selected.

The control is performed by writing operation unit 53. On the other hand, the physical expansion bits 43a and 43b are returned to zero when preliminarily provided digits is over-flowed by addition. Furthermore, upon generation of thread, the group selection bit 41 and the physical expansion bits 43a and 43b output from the multiplexers 52a and 52b are copied via the register mapping table 11 of thread generating destination.

Hereinafter, register reference operation after initiation of thread, operation upon thread generation and register reference operation after thread generation will be discussed in order to timing. The following discussion will be given for operation to be performed by the register conversion stage 33 in FIG. 3.

Figure 8:
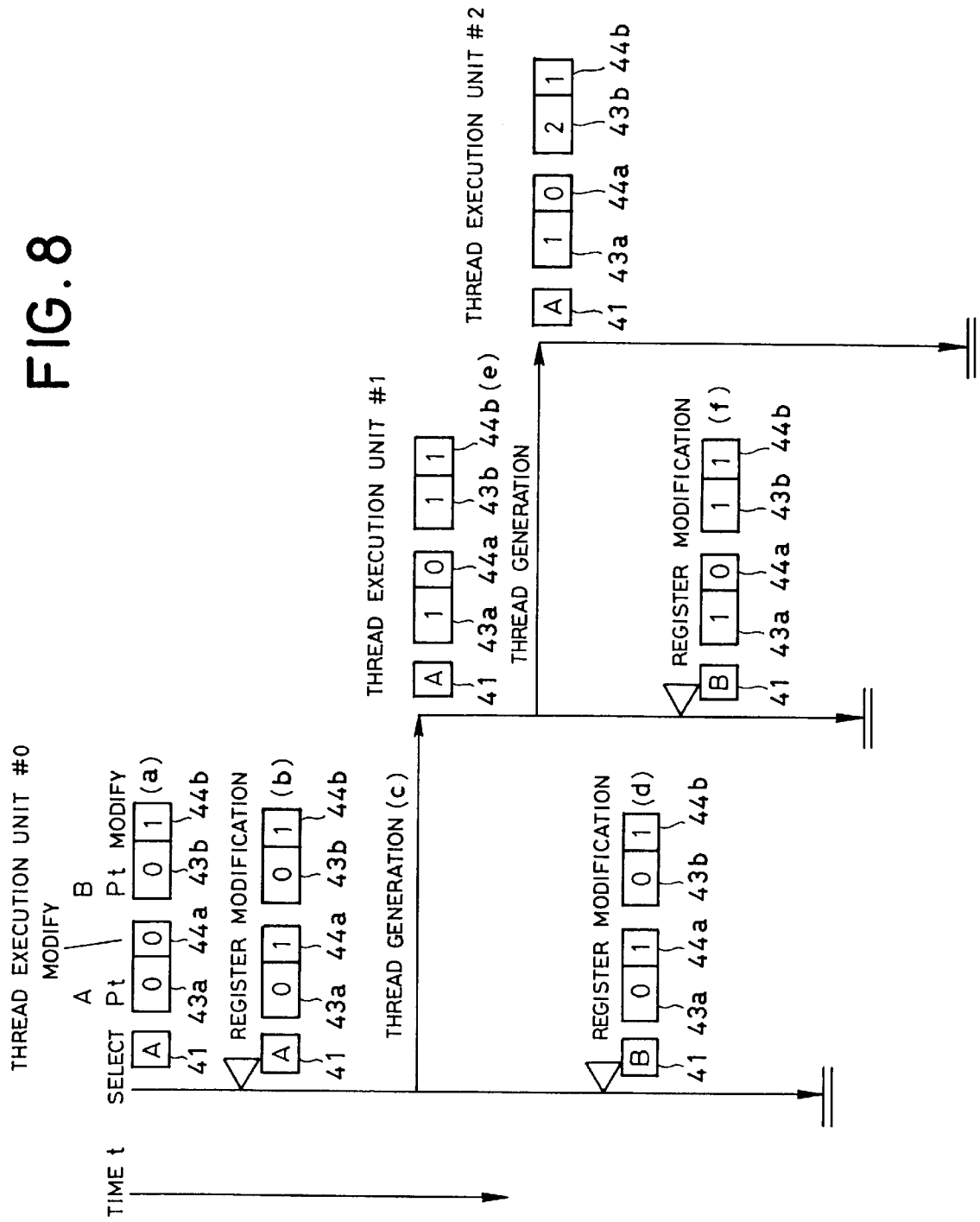
FIG. 8 is an illustration for explaining a mechanism showing transition of a group selection bit, physical expansion bit and modifying bits in normal operation and thus realizing the register content inheriting, in the first embodiment of the present invention.

FIG. 8 is an illustration for explaining a mechanism of transition of values of the group selection bit 41, the physical expansion bits 43a and 43b and the modification bits 44a and 44b during normal operation in the first embodiment of the present invention, and a mechanism of realizing register content inheriting by transition of the values. It should be noted that operation of the write back bits 45a and 45b is neglected herein and will be discussed later.

At a timing (a) of initiation of a new thread by the thread execution unit (#0) 1-0, the group selection bit 41 is set "A". On the selected side "A", the physical expansion bit 43a is set to zero and the modification bot 44a is also set to zero.

On the non-selected side, the physical expansion bit 43b is set zero whereas the modification bit 44b is preliminarily set "1" for non-selected side. In this case, the logic register 10 makes reference to by reading the physical register 21 positioned at zero of "A".

At the occurrence of write reference, namely at a timing (b) of register variation, the modification bit 44a of "A" is set to one. Variation is performed for the physical register 21 positioned at one of "A", subsequent reading reference is performed for the same register. Thereafter, writing reference for the same register is caused, the group selection bit 41 and the modification bits 44a and 44b are not modified.

Next, at a timing (C) for generating new thread, since the group selection bit 41 is "A", "A" is set in either of "A" and "B" of the modification bits 44a and 44b. Therefore, the values derived by adding one to the physical expansion bits 43a and 43b are transmitted to the register mapping table 11-1 of the thread execution unit (#1) 1-1.

Upon performing register write reference for the first time after thread generation by the thread execution unit (#0) 1-0, namely, the group selection bit 41 is varied from "A" to "B" at a timing (d). Variation is performed for the physical register 21 positioned at o1 of "B". Subsequently, reading reference is also performed for the same register.

Even if writing reference is caused for the same register, the group selection bit 41 or modification bits 44a and 44b are not varied. By this, the register value which can make reference to by the thread execution unit (#1) 1-1 is held at the position of 0 of "A".

In the thread execution unit (#1) 1-1, new thread is generated at a timing (e) without causing write reference of the register. Accordingly, the physical expansion bit 43a of "A" on the group of the selected side is transmitted the value as it is. Accordingly, the register content of the thread executed by the thread execution unit (#0) 1-0 is transferred to the thread executed by the thread execution unit (#2) 1-2. On the other hand, when the register modification is performed at the timing (f), since the timing is after fork, the group selection bit 41 is switched from "A" to "B".

Figure 9:
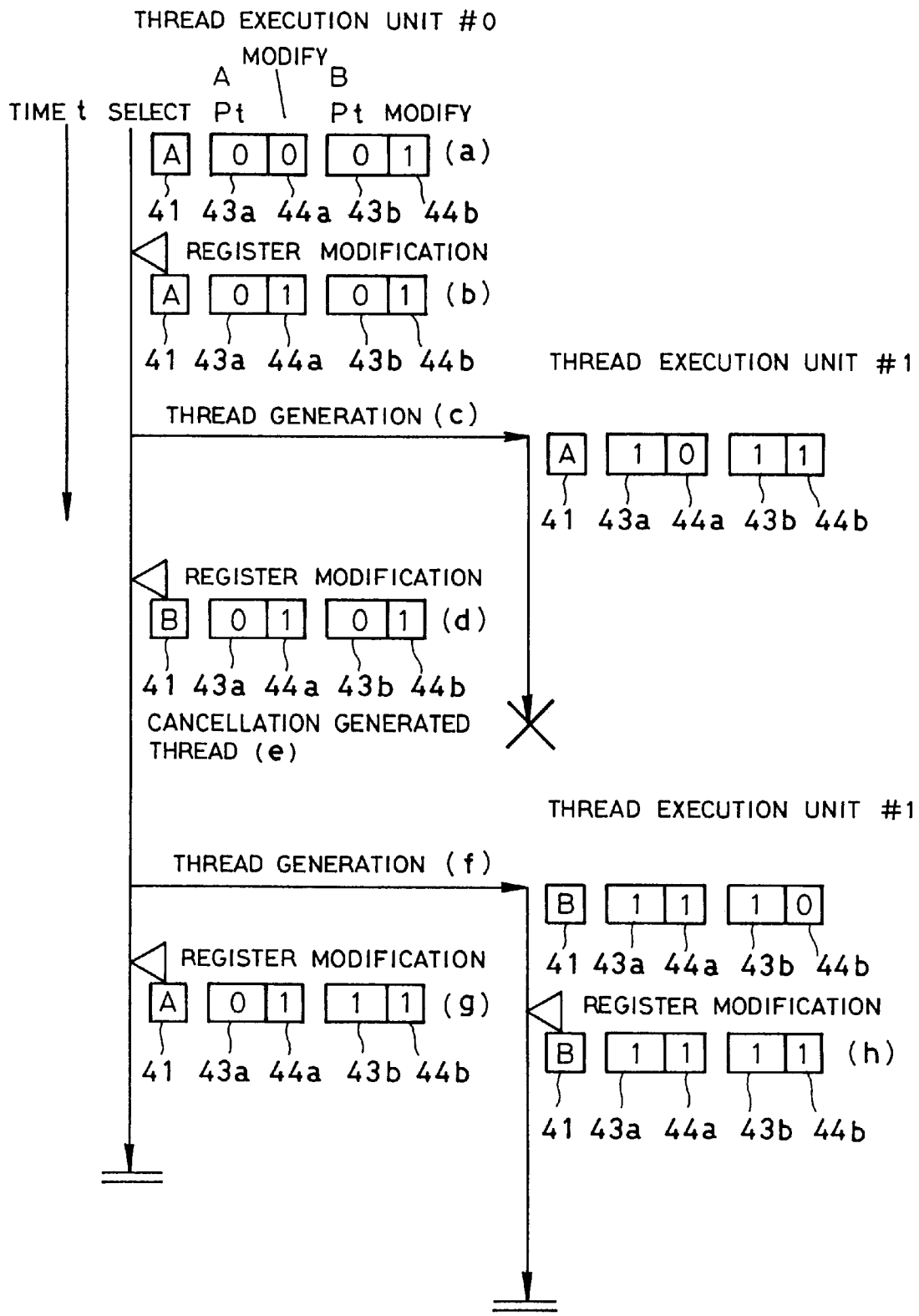
FIG. 9 is an illustration for explaining a mechanism showing transition of a group selection bit, physical expansion bit and modifying bits in speculative thread generation and thus realizing the register content inheriting, in the first embodiment of the present invention.

FIG. 9 is an illustration for explaining mechanism for transition of values of the group selection bit 41, physical expansion bit 43a and 43b and modification bit 44a and 44b and whereby for realizing register content inheriting. Among operation shown in FIG. 9, (a) to (d) are the same as operations of (a) to (d) of FIG. 8.

At a timing of (e), the thread execution unit (#0) 1-0 cancels the thread generated at the timing (c). Also, at a timing (f), the thread is generated again. Since the group selection bit 41 is "B", "B" is set. The modification bits 44a and 44b are set "A" and "B". Therefore, the values derived by adding one to the values of the physical expansion bits 43a and 43b are transmitted to the register mapping table 11 of the thread execution unit (#1) 1-1.

By this, the value varied at the timing (d) is inherited to the thread to be executed by the thread execution unit (#1) 1-1. At a timing (g), when the content of the register is varied, the group selection bit 41 is returned to "A", again.

Figure 10:
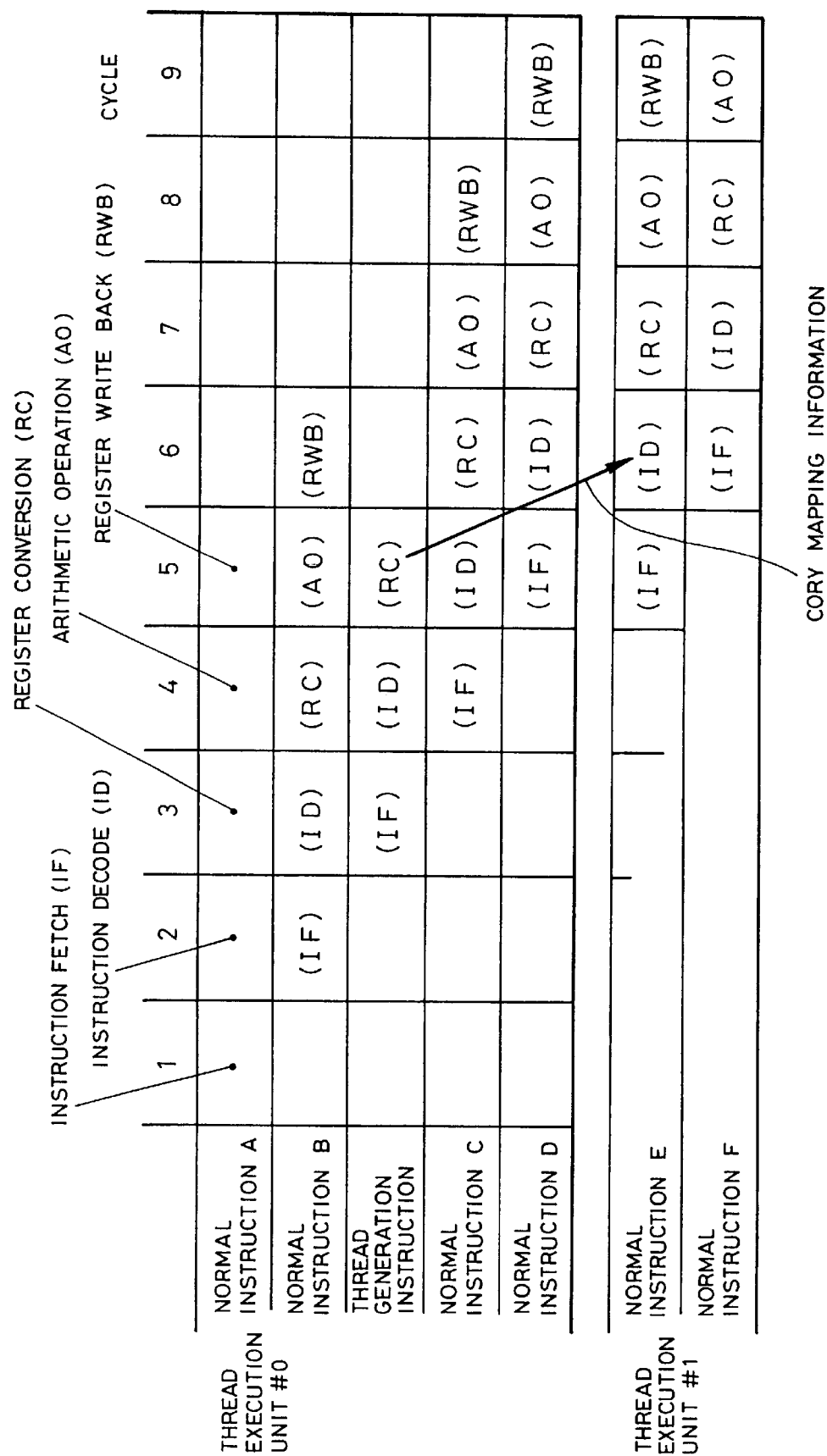
FIG. 10 is an illustration showing a timing of copying a mapping information in the pipeline operation shown in FIG. 3.

FIG. 10 is an illustration showing a timing of copying the mapping information in the pipeline operation shown in FIG. 3. In FIG. 10, copying of the register mapping information is performed in such a manner that the thread generation instruction is transmitted in the register conversion stage (cycle 5 of FIG. 19). In the register conversion stage, the register inheriting information is transmitted from the thread execution unit (#0) 1-0. Then, in the next cycle (cycle 6 of FIG. 10), the register inheriting information is written in the register mapping table 11 of the thread execution unit (#1) 1-1. It should be noted that the content of the group selection bit 41 of the register mapping table 11 of the thread execution unit (#0) 1-0 is copied together with the on-inheriting group selection bit 42 in the same register mapping table 11.

In the normal instruction E at cycle 7, the register inherited with reference to the register mapping table 11 is accesses. At a timing where the thread execution units 1-0 to 1-3 in the thread generating destination is in execution of other thread and where the thread generation demand becomes acceptable following the condition where new thread generation demand is not accepted, the value of the on-inheriting group selection bit 42 may be transmitted in place of the group selection bit 41.

Finally, discussion will be given with respect to write back bits 45a and 45b. The write back bits 45a and 45b are used for returning the modification bits 44a and 44b to correct values when instruction requiring write reference to the register is canceled in certain cause (for example, failure of prediction of the condition branch instruction or so forth).

One of the write back bits 45a and 45b on the selected side is reset and the other on the non-selected side is set by the group selection bit 41. The write back bits 45a and 45b which is in reset condition, is set when the result of actual calculation by the arithmetic unit 14 is written back in the physical common register file 2.

Namely, the fact that the modification bits 44a and 44b are set and the write back bits 45a and 45b are not set, represent that the instruction for setting the modification bits 44a and 44b are not yet completed.

Accordingly, when cancellation of the instruction occurs at this stage, the content of the write back bits 45a and 45b are copied to the modification bits 44a and 44b to return to the initial values to return the register mapping table 11 to normal value upon cancellation of instruction.

By the foregoing method, inheriting of the register is realized without copying the actual content of the register and with taking only physical common register file 2 as common resource.

Each physical expansion bit 26 is added merely one upon-inheriting. Therefore, by providing two sets of register groups of the number corresponding to the thread execution units 1-0 to 1-3, the foregoing mechanism can be realized.

Figure 11:
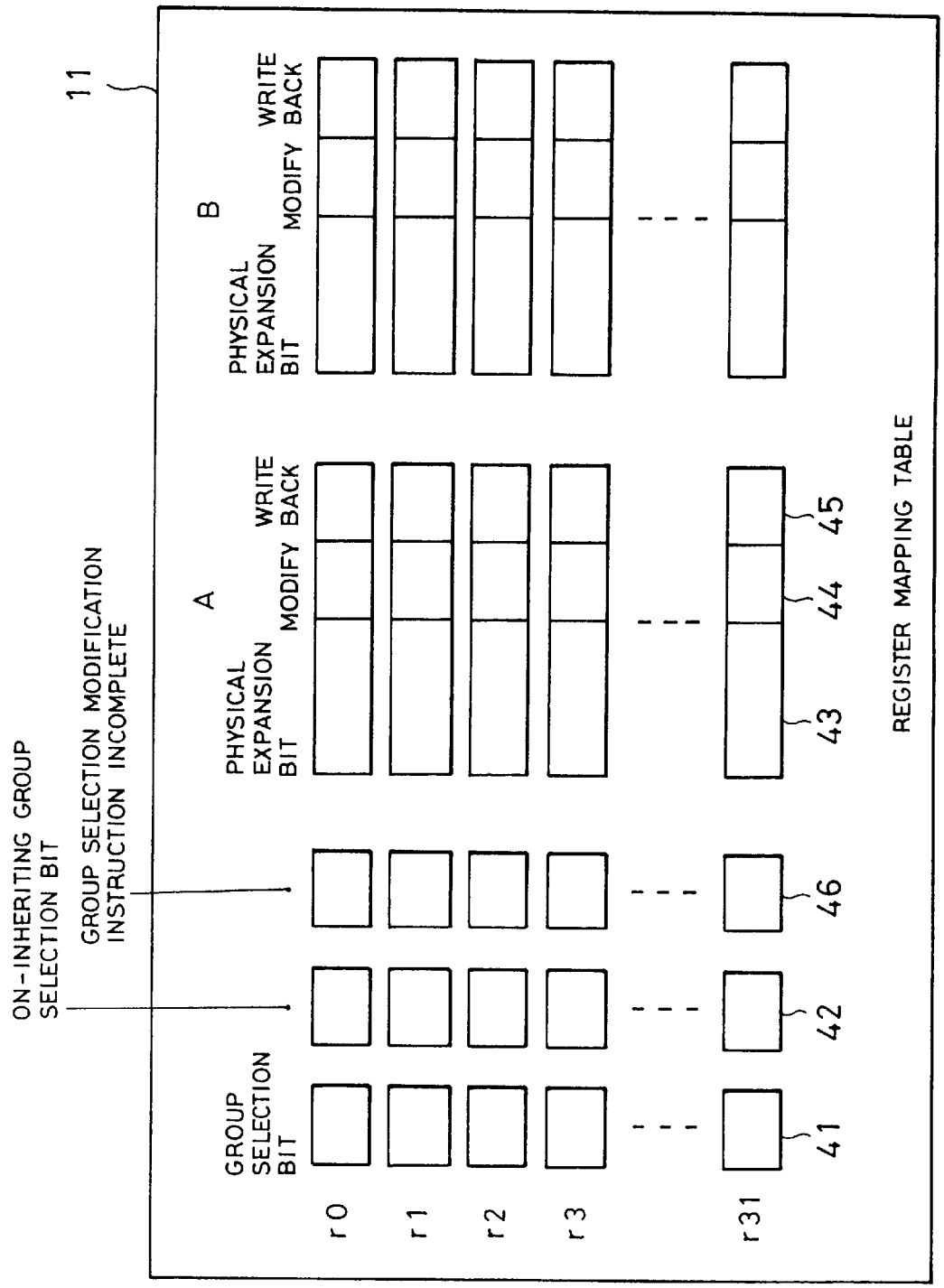
FIG. 11 is an illustration showing a detailed construction of a register mapping table in the second embodiment of the present invention.

FIG. 11 is an illustration showing the detailed construction of the register mapping table in the second embodiment of the present invention. In FIG. 11, the second embodiment of the present invention is similar to the first embodiment of the present invention illustrated in FIGS. 1 to 5 except for a construction of the register mapping table 11.

In FIG. 11, the register mapping table 11 is divided into groups A and B to be selected by the group selection bit 41 per logical register number 22. Each of the A group and B group is consisted of the physical expansion bit 43, the modification bit 44, the write back bit 45. Also, the register mapping table 11 has the on-inheriting group selection bit 42 and a group selection modification instruction incompletion bit 46.

The group selection bit 41 represents the group of the physical common register file 2 to which the thread execution unit 1 makes reference to. Together with the physical expansion bit 43, the physical register 21 to be assigned is determined depending upon the logical registration number 22.

The modification bit 44 represents whether the instruction for updating the physical register 21 selected by the group selection bit 41 is decoded for one or more times by the thread execution units 1-0 to 1-3.

The write back bit 45 represents whether the instruction for updating the physical register 21 is actually completed for one or more times, or not. The on-inheriting group selection bit 42 is the copy of the content of the group selection bit 41 at a timing where the register content is inherited from one thread execution units 1-0 to 103 to the other thread execution units 1-0 to 1-3.

Figure 12:
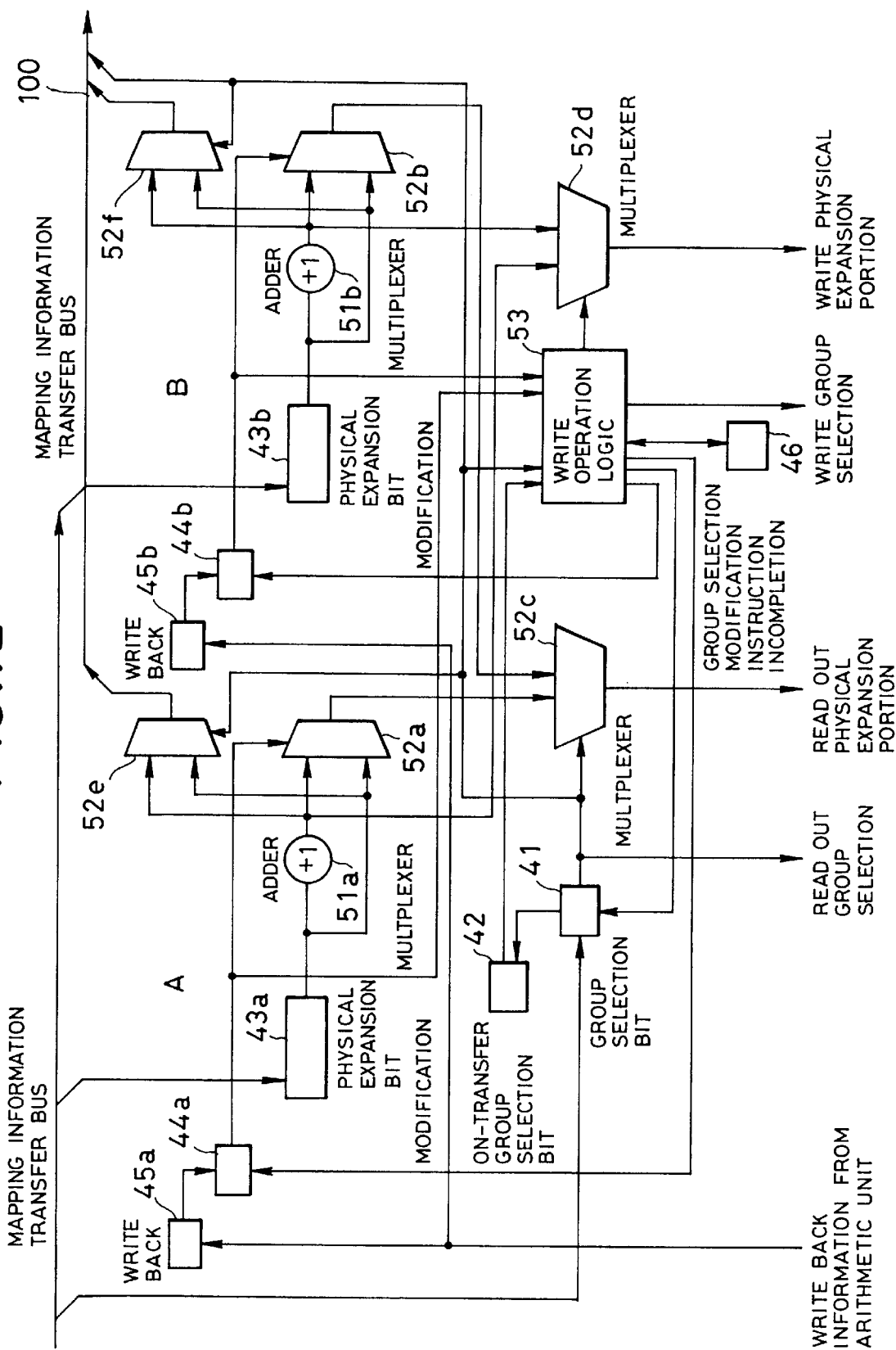
FIG. 12 is an illustration showing the detailed construction of one entry of the register mapping table of FIG. 11.

FIG. 12 is an illustration showing a detailed construction of the entry of the register mapping table 11 of FIG. 11. In FIG. 12, the register mapping table 11 is provided with adder 51a and 51b, the multiplexers 52a to 52f and write operation logic 53, in addition to the bits shown in FIG. 11.

The group selection bit 41 is reset (representing the side "A") when the value before modification is set (representing the side "B") and is set (representing the side "B") when the value before modification is reset (representing the side "A") when the instruction for modifying the register value by writing at the first time in response to the instruction of the thread execution unit 1-0 to 1-3 after fork in the fork one time model, namely after performing thread generation.

When the group selection bit 41 and the on-inheriting group selection bit 42 are the same, re-writing at the first time after fork is detected. Since the on-inheriting group selection bit 42 stores the copy of the group selection bit 41 upon thread generation, this judgment can be performed.

The group selection modification instruction incompletion bit 46 is set when the instruction for varying the group selection bit 41 passes the register conversion stage 33, and is reset at a timing where the instruction reaches the write back stage 35.

The modification bits 44a and 44b are reset the group side selected by the group selection bit 41 upon initiation of own thread. Subsequently, when the instruction for modifying the register value is received from the instruction decoder 13, modification bits 44a and 44b on the side selected by the group selection bit 41 is set.

The write back bits 45a and 45b is reset upon initiation of own thread. The write back bits 45a and 45b which is in reset is set when the result actually calculated by the arithmetic unit 14 is written back to the physical common register file 2.

By this, expansion of the physical register number is performed for the physical register 10 according to a principle set forth below. At first, upon reading reference, the multiplexers 52a and 52b directly outputs the values of the physical expansion bits 43a and 43b when the modification bits 44a and 44b are reset, and selects values derived by adding one to the values of the physical expansion bits 43a and 43b by the adders 51a and 51b, when the modification bits 44a and 44b are set.

Among these values, the value of A group or B group is selected by a value indicated by the group selection bit 41 in the multiplexer 52c to output as the physical expansion bit 26 for reading reference.

Even if the either A group or B group is selected as the physical expansion bit upon modification of the writing register, the values derived by adding one to the values of the physical expansion bits 43a and 43b by the adders 51a and 51b are output. Therefore, as the input for the multiplexer 52d, the values past through the adders 51a and 51b from the physical expansion bits 43a and 43b are used in either case of A group and B group.

Selection of A group and B group is performed according to the value of the group selection bit 41. In case of register variation associating with re-writing of the group selection bit 41, the group after re-writing is selected.

Control is performed by writing operation logic 53. On the other hand, when the preliminarily provided digit is overflowed by addition to the values of the physical expansion bits 43a and 43b, the value is returned to zero. Furthermore, upon thread generation, the value has to be set to the value in the mapping table in the thread generation destination.

This value is determined on the basis of the value of the mapping table 11 of the thread generation source.

At first, the group selection bit 41 is set to the same value as the group selection bit 41 of the mapping table 11 of the thread generation source. Next, the values of the physical expansion bits 43a and 43b become values derived by adding one to the values of the physical expansion bits 43a and 43b when the modification bits 44a and 44b corresponding to the physical expansion bits 43a and 43b of the group selected by the group selection bit 41 of the mapping table 11 of the thread generation source are set, and become values of the physical expansion bits 43a and 43b when the modification bits 44a and 44b are not set.

On the other hand, in the physical expansion bits 43a and 43b of the group not selected by the group selection bit 41 of the mapping table 11 of the thread generation source, the values derived by adding one to the values of the physical expansion bits 43a and 43b are set. Then, the modification bits 44a and 44b, the write back bits 45a and 45b, the group selection modification instruction incompletion bit 46, on-inheriting group selection bit 42 are reset. At the same time, the mapping table of the thread generation source, the value of the group selection bit 41 is copied to the on-inheriting group selection bit 42.

Thus, after modification of register by writing, by using the values derived by adding one to the values of the physical expansion bits 43a and 43b, the logical register number to be used in the thread execution units 1-0 to 1-3 become equal to those in the same physical bits 26 in the physical common register file upon-inheriting of register content. On the other hand, when modification is effected, the logical register number becomes equal to the different physical bit 26. Thus, by the thread execution units 1-0 to 1-3, logically independent logical registers 10-0 and 10-1 and register content inheriting can be realized.

Hereinafter, register reference operation after initiation of thread, operation upon thread generation and register reference operation after thread generation will be discussed in order to timing. The following discussion will be given for operation to be performed by the register conversion stage 33 in FIG. 3.

Figure 13:
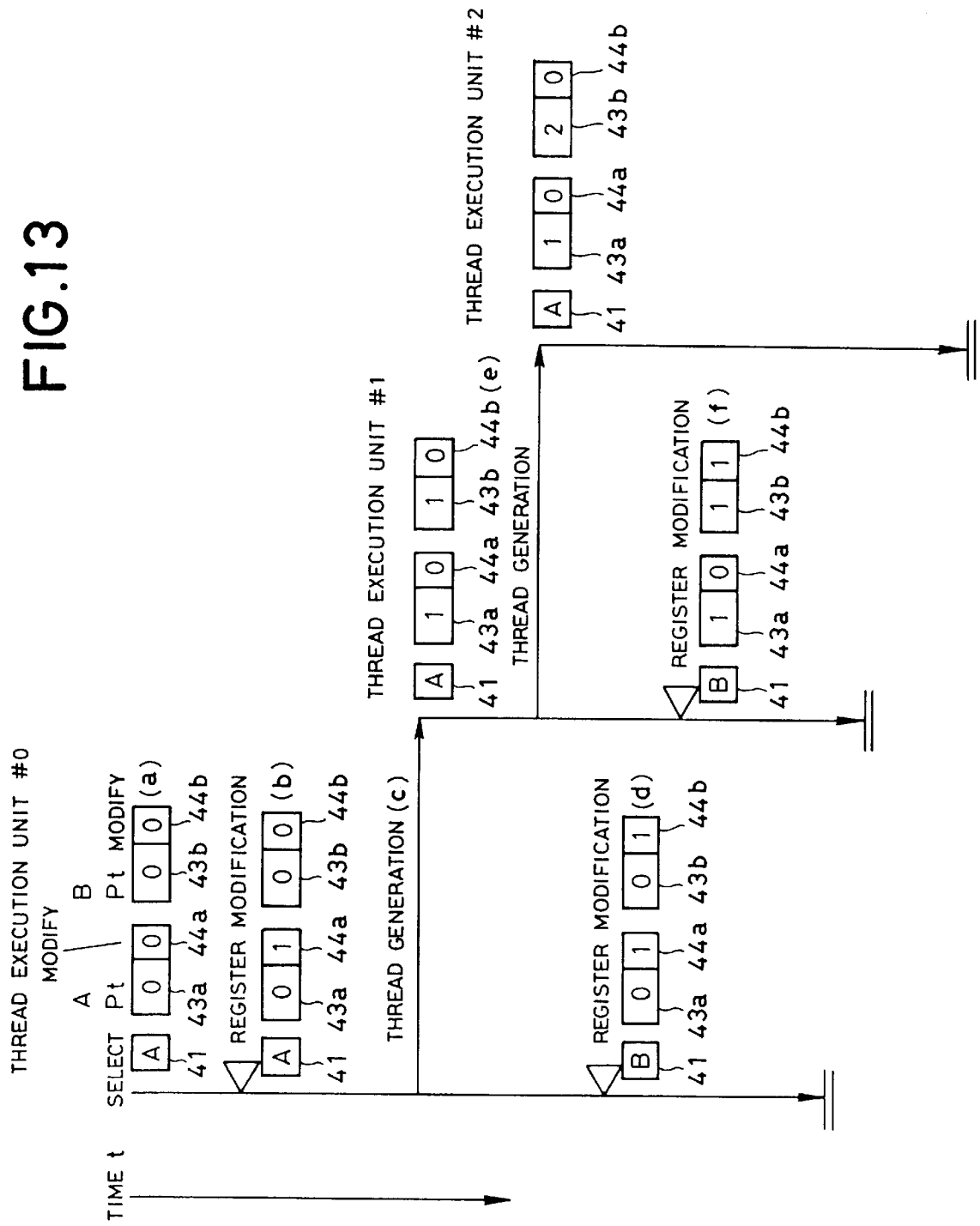
FIG. 13 is an illustration for explaining a mechanism showing transition of a group selection bit, physical expansion bit and modifying bits in normal operation and thus realizing the register content inheriting, in the second embodiment of the present invention.

FIG. 13 is an illustration for explaining a mechanism of transition of values of the group selection bit 41, the physical expansion bits 43a and 43b and the modification bits 44a and 44b during normal operation in the second embodiment of the present invention, and a mechanism of realizing register content inheriting by transition of the values. It should be noted that operation of the write back bits 45a and 45b is neglected herein and effects of the write back bits 45a and 45b and the group selection modification instruction incomletion bit 46 will be discussed later.

At a timing (a) of initiation of a new thread by the thread execution unit (#0) 1-0, the group selection bit 41 is set "A". On the selected side "A", the physical expansion bit 43a is set to zero and the modification bit 44a is also set to zero. On the non-selected side "B", the physical expansion bit 43b is set zero whereas the modification bit 44b is set zero.

In this case, upon reading out the content of the register, reference is made to the physical register 21 located at the position of 0 of "A". When the register conversion stage 33 is reached by issuing instruction performing modification by register writing, namely at the timing of register modification (b), modification bit 44a of "A" is set to one.

Modification is performed for the physical register 21 located at the position 1 of "A", and subsequently, reading reference is performed for the same register. Thereafter, even when writing reference is caused for the same register, the group selection bit 41 and the modification bit 43a are held unchanged.

Next, at a timing (c) where new thread is generated, the value of the group selection bit 41 (here "A"), the value derived by adding one to the value of the physical expansion bit 43a (here 1) since the modification bit 44a is set as selected side "A" and value derived by adding one to the value of the physical expansion bit 43b irrespective of the modification bit 44b (here 1) on the non-selected side are transmitted to the register mapping table 11 of thread execution unit (#1) 1-1.

When the thread execution unit (#0) 1-0 issues the instruction for performing register writing reference at the first time after generation of the thread, namely at a timing (d), the value of the group selection bit 41 is switched from "A" to "B" and the modification bit 44b is set.

Modification is performed for the physical register 21 loaded at the position of 1 of "B". Subsequently, the reading reference is performed for the same register.

Thereafter, even when writing reference for the same register is caused, the group selection bit 41 and the modification bit 44b are held unchanged. By this, the register value which can be made reference to by the thread execution unit (#1) 1-1 is held at the position of 0 of "A".

In the thread execution unit (#1) 1-1, without inducing the writing reference of the register, new thread is generated at a timing (e). Accordingly, the physical expansion bit 43a of "A" of the group on the selected side transmits its own value. Therefore, the content of the register of the thread executed by the thread execution unit (#0) 1-0 is transferred by the thread executed by the thread execution unit (#2) 1-2. On the other hand, upon performing register modification at a timing (f), since the timing is after fork, the value of the group selection bit 41 is switched from "A" to "B" and then, the modification bit 44b is set.

Figure 14:
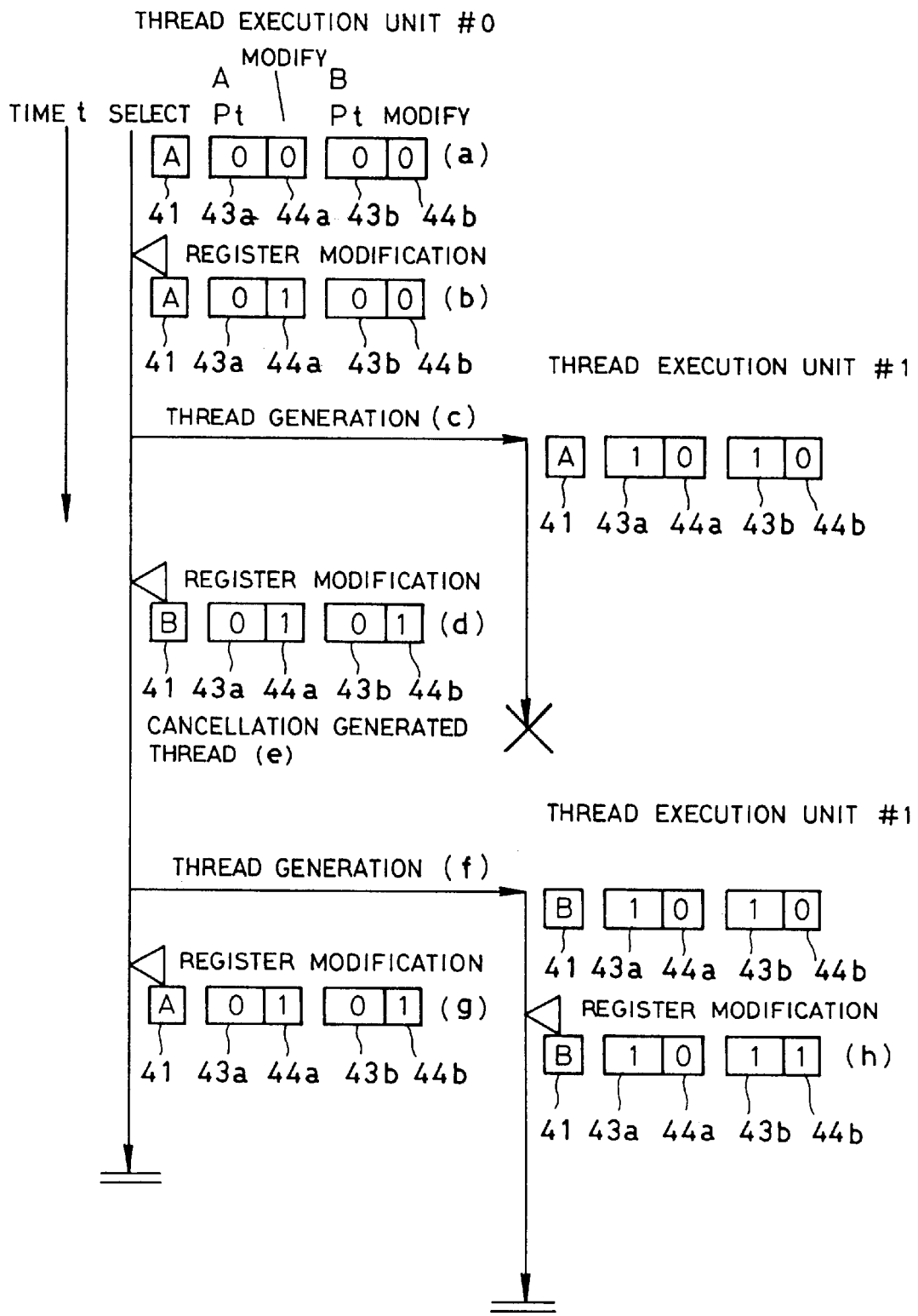
FIG. 14 is an illustration for explaining a mechanism showing transition of a group selection bit, physical expansion bit and modifying bits in speculative thread generation and thus realizing the register content inheriting, in the second embodiment of the present invention.

FIG. 14 is an illustration showing a mechanism of transition of values of the group selection bit 41, the physical expansion bits 43a and 43b and modification bits 44a and 44b in the case where speculative thread generation is performed in the second embodiment of the present invention, and whereby realizing inheriting of the content of the register. Among operations shown in FIG. 14, (a) to (d) are the same as operations of (a) to (d) of FIG. 13.

At a timing of (e), the thread execution unit (#0) 1-0 cancels the thread generated at the timing (c). Also, at a timing (f), the thread is generated again. Since the group selection bit 41 is "B", "B" is transmitted to the register mapping table 11 of the thread execution unit (#1) 1-1. Likewise, since the modification bit 44b is set on the selected side "B", the value derived by adding one to the valve of the physical expansion bit 43b is transmitted to the register mapping table 11 of the thread execution unit (#1) 1-1. Also, on the non-selected side A, the value derived by adding one to the value of the physical expansion bit 43a is transmitted to the register mapping table 11 of the thread execution unit (#1) 1-1 irrespective of the value of the modification bit 44a. The modification bits 44a and 44b are set "A" and "B".

By this, the value varied at the timing (d) is transferred to the thread to be executed by the thread execution unit (#1) 1-1. At a timing (g), when the content of the register is varied, the group selection bit 41 is returned to "A", again.

Finally, effects of the write back bits 45a and 45b and group selection modification instruction incompletion bit 46 will be discussed. When the instruction for making reference to in writing in the register is canceled in certain reason (for example, failure of prediction of the condition branching instruction), the group selection modification instruction incompletion bit 46 is used for returning the group selection bit 41 to the condition before execution of the writing reference instruction which is canceled.

The write back bits 45a and 45b are reset upon initiation of own thread. The write back bits 45a and 45b are set when the result of actual calculation calculated by the arithmetic unit 14 is written back in the physical common register file 2, namely, at the register write back stage 35 in FIG. 3.

On the other hand, upon issuing the register writing instruction, namely at register conversion stage 33, the modification bits 44a and 44b are set. From these, the condition where the modification bits 44a and 44b are set and the write back bits 45a and 45b are not set, represents a condition where the instruction for setting the modification bits 44a and 44b are not completed.

Accordingly, when cancellation of the instruction at this stage is caused, by copying the content of the write back bits 45a and 45b to the modification bits 44a and 44b, it becomes possible to return the value to that before execution of writing reference of the cancelled instruction.

The group selection modification instruction incompletion bit 46 is reset upon initiation of thread. When the instruction for modifying the group selection bit 41 reaches the register conversion stage 33, the group selection modification instruction incompletion bit 46 is set. The group selection modification instruction incompletion bit 46 is reset when the instruction reaches the register write back stage 35. Namely, while the group selection modification instruction incompletion bit 46 is set, it indicates that the instruction for modifying the group selection bit 41 is not completed.

When cancellation of the instruction is caused in this condition, the group selection bit 41 corresponding to the set group selection modification instruction incompletion bit 46 is reversed. Subsequently, the group selection modification instruction incompletion bit 46 is reset. By these process, upon cancellation of instruction, the register mapping table 11 can be returned to the condition before execution of the instruction.

By the method discussed above, it becomes possible to realize inheriting of the content of the register with taking only physical common register file 2 as the common resource without performing copying of the actual content of the register.

Each physical expansion register 26 is merely added one upon-inheriting. Therefore,the foregoing mechanism can be realized by providing two sets of register groups in number corresponding to the number of the thread execution units 1-0 to 1-3.

Next, the third embodiment of the present invention will be discussed. The third embodiment of the present invention is similar to the first embodiment of the present invention. The following discussion will be given for difference of the shown embodiment relative to the first embodiment.

Figure 15:
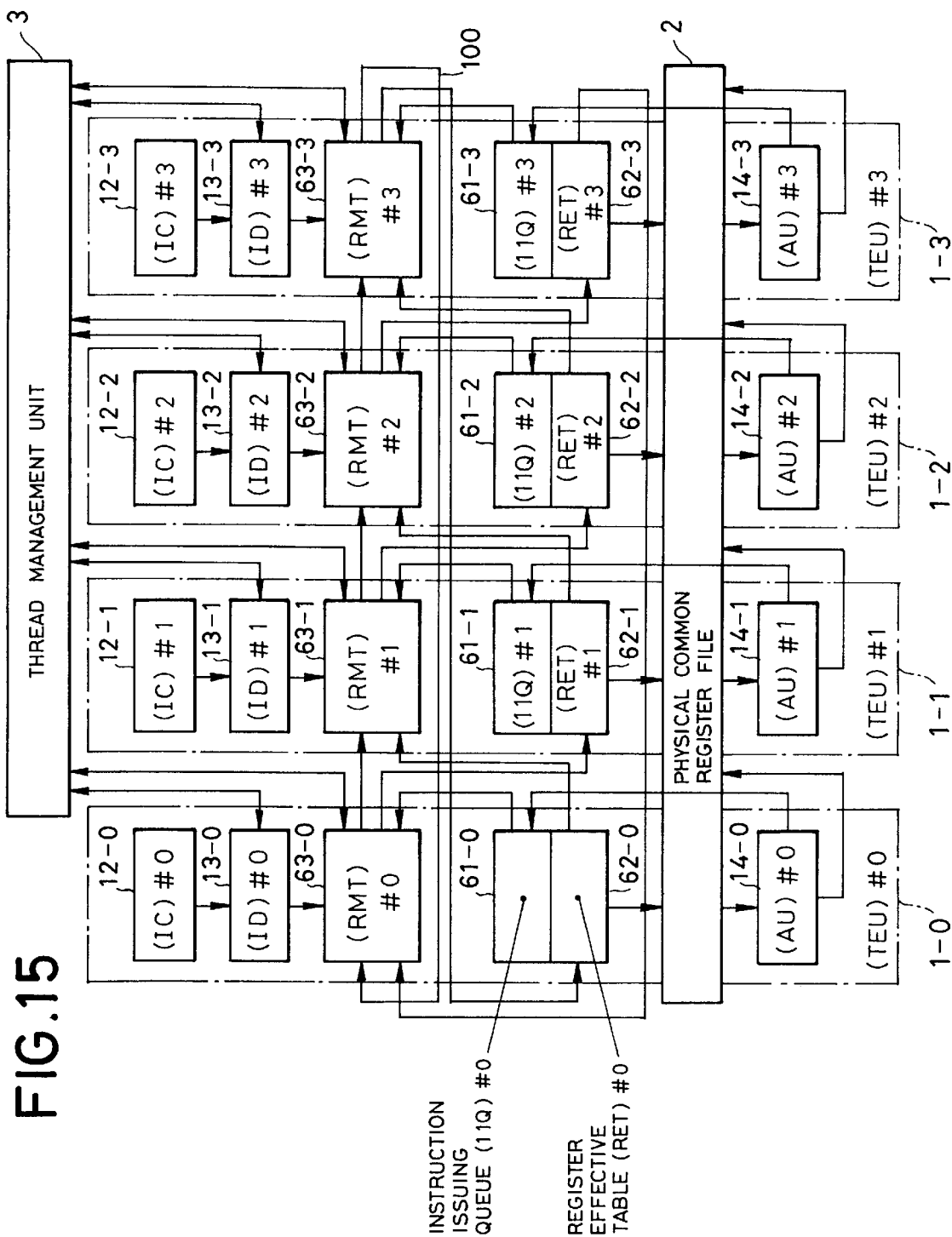
FIG. 15 is a block diagram showing a construction of the third embodiment of the register content inheriting system in the multi-processor according to the present invention.

FIG. 15 is a block diagram showing a construction of the third embodiment of the register content inheriting system in the multi-processor. In FIG. 15, there is illustrated a construction of a four thread parallel execution type multi-processor.

The multi-processor in the third embodiment of the present invention has similar construction as the multi-processor in the first embodiment of the present invention except for the register mapping tables (#1 to #3) 63-0 to 63-3 provided in place of the register mapping tables (#0 to #3) 11-0 to 11-3 of the foregoing first embodiment. It should be noted that, in the following disclosure, like elements to those in the first embodiment will be identified by the same reference numerals and detailed description thereof will be neglected for avoiding redundant discussion and whereby for keeping the disclosure simple enough to facilitate clear understanding of the present invention.

The third embodiment of the multi-processor according to the present invention is constructed with the thread management unit 3, the four sets of thread execution units (#0 to #3) 1-0 to 1-3, and a physical common register file 2.

Respective thread execution units 1-0 to 1-3 are constructed with instruction cache (#0 to #3) 12-0 to 12-3, instruction decoders (#0 to #3) 13-0 to 13-3, register mapping tables (#0 to #3) 63-0 to 63-3, instruction issuing queues (#0 to #3) 61-0 to 61-3, register effectiveness table 62-0 to 62-3, and arithmetic units (#0 to #3) 14-0 to 14-3.

On the other hand, the register mapping tables 63-1 to 63-3 are connected with adjacent register mapping tables through mapping information transfer bus 100 into a ring form.

The multi-processor is further provided a load/store unit, data cache memory, an external interface and so fort, in addition to the construction set forth above. However, such extra components are less relevant to the subject matter of the present invention. Therefore, these components are not illustrated and discussed.

Figure 16:
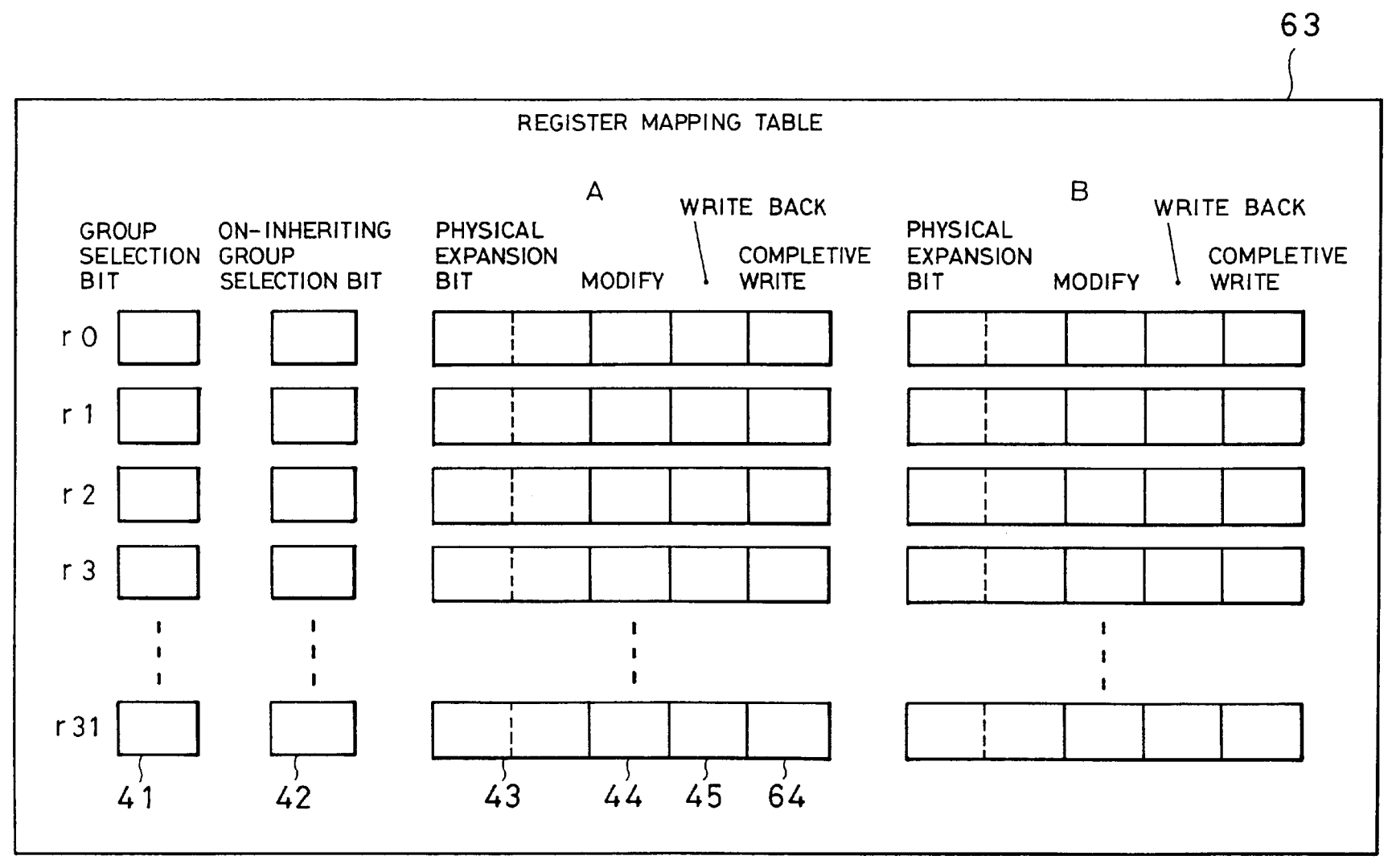

FIG. 16 is an illustration showing the detailed construction of the register mapping table 63 of FIG. 15. In FIG. 15, the register mapping table 63 has similar construction as the register mapping table 11 shown in FIG. 6, except for a completive writing bit 64.

Figure 17:
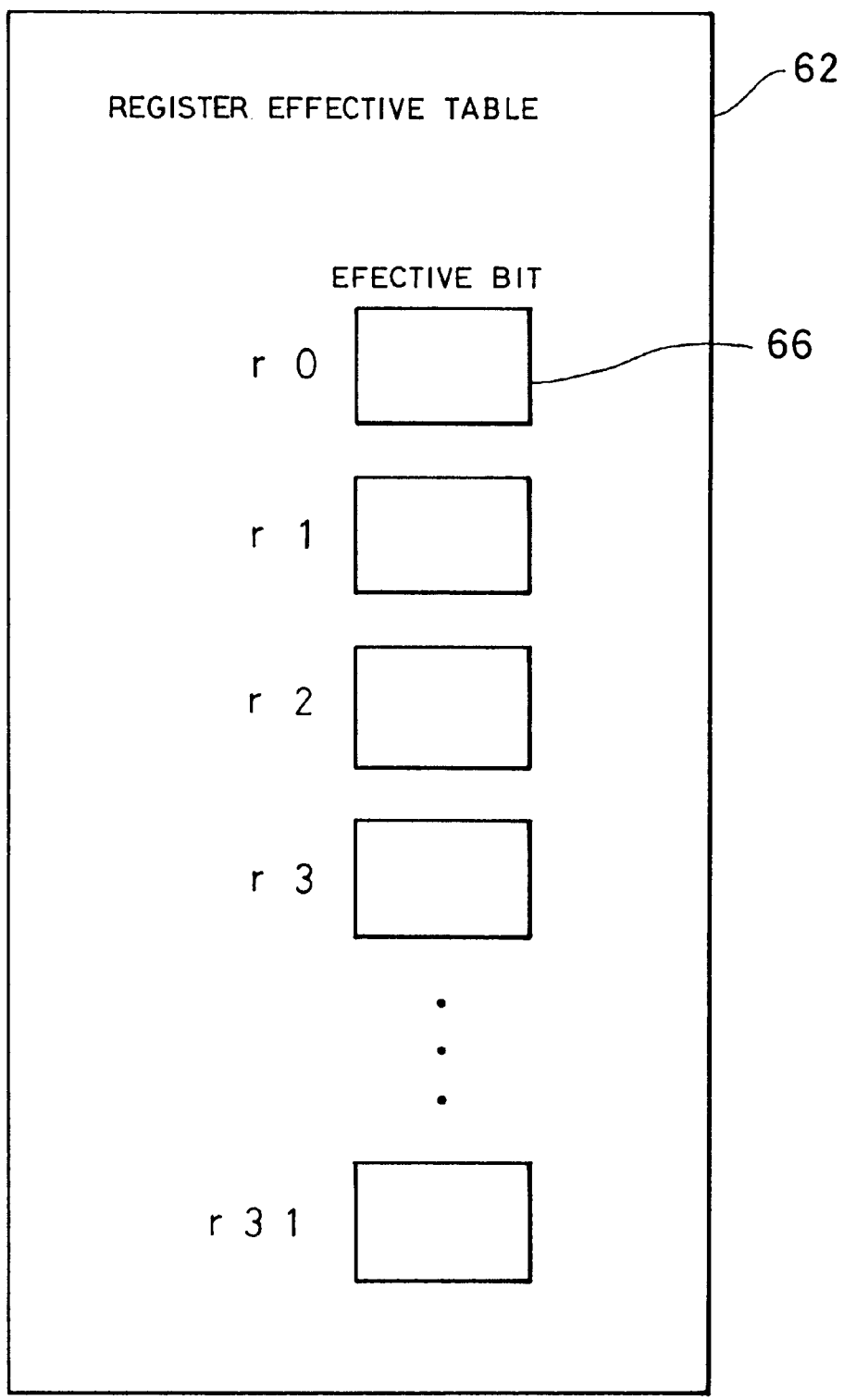
FIG. 17 is an illustration showing a detailed construction of the register effectiveness table of FIG. 15.

FIG. 17 is an illustration showing the detailed constructing of the register 62 of FIG. 15. In FIG. 17, the register effective has an effective bit 66 indicating effective/null of the values of the registers per each logical register number r0 to r31.

The register effectiveness table 62 is designed for indication that the value of the register inherited from the thread executed by other thread execution units 1-0 to 1-3 is fixed and thus effective or not fixed and thus null.

Figure 18:
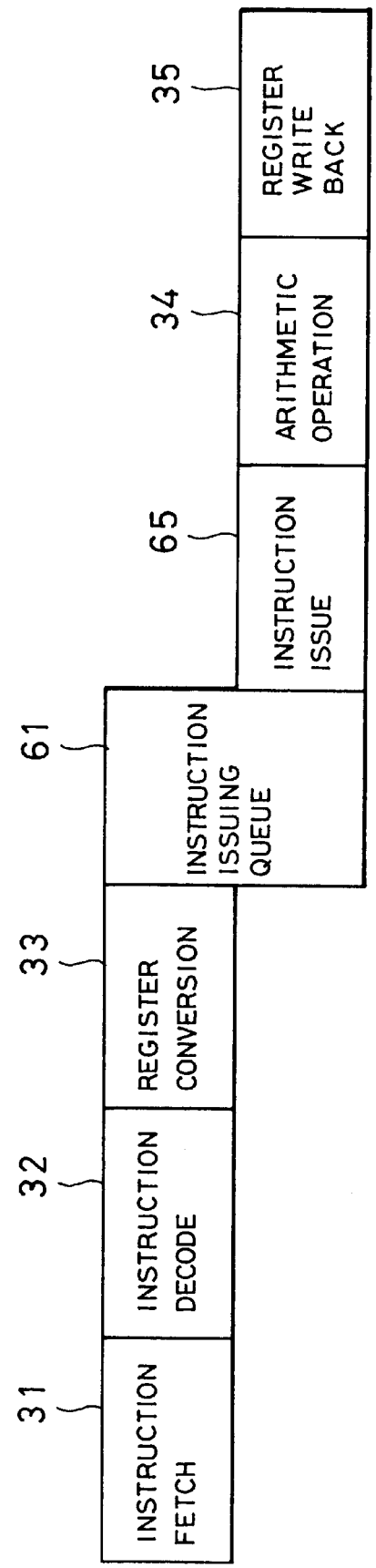
FIG. 18 is an illustration showing a pipeline stage in each thread executing unit of FIG. 15.

FIG. 18 is an illustration showing respective pipeline stage of the thread execution units 1-0 to 1-3 of FIG. 15. In the pipeline stage in each thread execution unit 1-0 to 1-3, execution of the instruction is completed through the instruction fetching stage 31, the instruction decoding stage 32, the register conversion table 33, the instruction issuing queue 61, the instruction issuing stage 65, the execution stage 34, the register write back stage 35. It should be noted that the instruction issuing stage 65 and subsequent stage can be realized by execution in out-of-order.

The instruction issuing queue performs 61 is into waiting until the value of the register which is to be used, reaches the value where the register value becomes effective.

Figure 19:
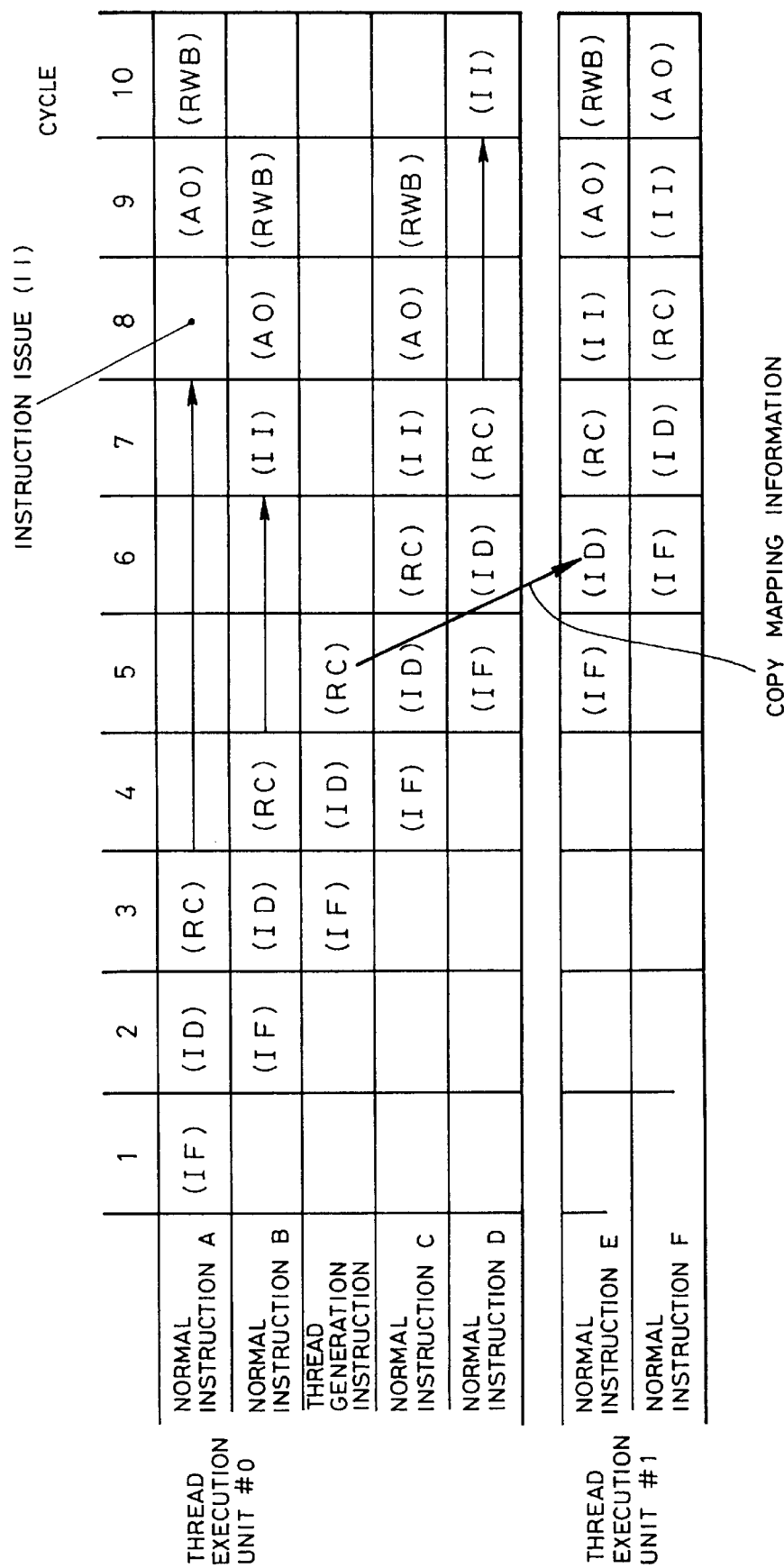
FIG. 19 is an illustration showing a timing of copying the mapping information in the operation of pipeline shown in FIG. 18.

FIG. 19 is an illustration showing a timing of copying the mapping information on in the operation of the pipeline. In FIG. 19, by employing the instruction issuing queue 61, it becomes possible to perform write back in out-of-order without performing write back in the program order shown in FIG. 10.

Accordingly, on the side of the thread execution units 1-0 to 1-3, in which execution of new thread is initiated, the register value which is inherited cannot be made reference to unless writing back is completed in the thread execution units 1-0 to 1-3 as initiated. In order to permit checking of completion of the write back operation, the register effectiveness table 62 is used.

When reading reference is made in the register mapping table 63, if the modification bits 44a and 44b of the group selected by the group selection bit 41 are set, the effective bit 66 has to be checked upon issuance of the instruction.

If the modification bits 44a and 44b are not set, checking of the effective bit 66 is not necessary.

FIG. 20 is an illustration showing a logic for determining effective/null in the effectiveness table 62 shown in FIG. 17. Setting and resetting method of the register effectiveness table 66 will be discussed with reference to FIGS. 17 to 20.

Respective effective bits 66 of the register effectiveness tables 62-0 to 62-3 are connected to respectively adjacent register mapping tables 63-0 to 63-3 of the thread execution units 1-0 to 1-3. The register effectiveness tables 62-0 to 62-3 receive effective/null information of the register from the register mapping tables 63-0 to 63-3 on a thread generation demanding side and feed the same information to the register effectiveness tables 63-0 to 63-3 adjacent on the opposite side.

The effective information is determined by the logic shown in FIG. 20 on the basis of combination of respective bits of the register mapping tables 62-0 to 62-3 and input signals from the register effectiveness tables 62-0 to 62-3 of the adjacent thread execution units 1-0 to 1-3.

Namely, in FIG. 20, in the thread execution unit #n, effective/null of the effective input to the thread execution unit #(n+1) in the following stage is determined depending upon the effective input from the thread execution unit # (n−1) in the preceding stage. On the other hand, when no effective input from the thread execution unit #(n−1) of the preceding stage is present, the effective/null of the effective unit to the thread execution unit #(n+1) of the following stage is determined depending upon completive write bit 64 in the thread execution unit #n.

The completive write bit 64 is set simultaneously with the modification bit 44. Upon writing back for the instruction for modifying the content of the register, whether writing instruction for the same register by general instruction up to the thread generation instruction is present or not is checked by comparing the instruction of the instruction issuing queue 61-0 to 61-3 and the instruction present in the execution stage 34 of the pipeline. If the instruction for modifying the content of the register is not present, the completive write bit 64 is reset.

Namely, the condition where the modification bit 44 is set and the completive write bit 64 is reset, represents that while the content of the register is rewritten up to thread generation, the value is reflected to the physical common register file 2. From this information, the register effectiveness tables 62-0 to 62-3 of the adjacent thread execution units 1-0 to 1-3 are set. When the modification bit 44 is not set, the information from the thread before that is set as is.

Subsequently, discussion will be given for the fourth embodiment of the present invention. The fourth embodiment of the present invention is similar to the second embodiment of the present invention. Different points of the fourth embodiment relative to the second embodiment will be discussed hereinafter. The fourth embodiment is realized by using respective components shown in FIGS. 17 to 20.

Figure 21:
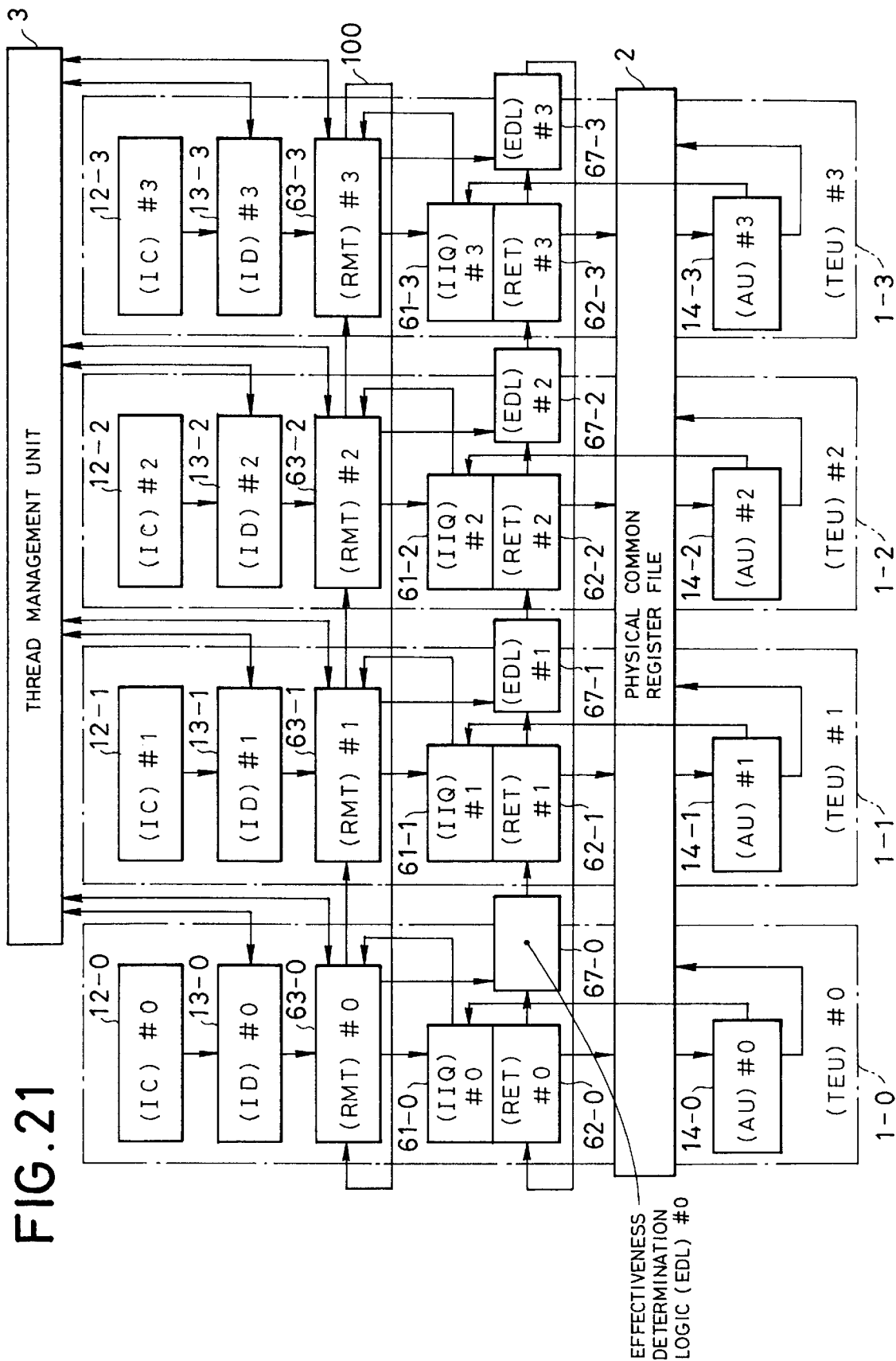
FIG. 21 is a block diagram showing the fourth embodiment of the register content inheriting system in the multi-processor according to the present invention.

FIG. 21 is a block diagram showing the construction of the fourth embodiment of the register content inheriting system in the multi-processor according to the present invention. In FIG. 21, there is shown a construction of a four thread parallel execution type multi-processor.

The fourth embodiment of the multi-processor according to the present invention is similar to the second embodiment of the multi-processor according to the present invention except that register mapping tables (#0 to #3) 63-0 to 63-3 modified from the construction of the register mapping tables (#0 to #3) 11-0 to 11-3 of the second embodiment are provided and the instruction issuing queues 61-0 to 61-3, the register effectiveness tables 62-0 to 62-3 and effectiveness determining logic 67-0 to 67-3 are added. It should be noted that like components to those in the second embodiment set forth above will be identified by like reference numerals and detailed description therefor will be neglected in order to avoid redundant disclosure for keeping the disclosure simple enough to facilitate clear understanding of the present invention.

Namely, the fourth embodiment of the multi-processor according to he present invention is constructed with the thread management unit 3, four sets of thread execution units (#0 to #3) 1-0 to 1-3 and the physical common register 2.

Respective thread execution units (#0 to #3) 1-0 to 1-3 are constructed with instruction caches (#0 to #3) 12-0 to 12-3, instruction decoder (#O to #3) 13-0 to 13-3, the register mapping tables (#0 to #3) 63-0 to 63-3, the instruction issuing queues (#0 to #3) 61-0 to 61-3, the register effectiveness tables (#0 to #3) 62-0 to 62-3, the effectiveness determining logic (#0 to #3) 67-0 to 67-3 and arithmetic units (#0 to #3) 14-0 to 14-3.

On the other hand, the register mapping tables (#0 to #3) 63-0 to 63-3 are connected with adjacent register mapping tables (#1 to #3, #0) 63-1 to 63-3, 63-0 by the mapping information transfer bus 100 into a ring shape. The multi-processor further requires the load/store unit, data cache memory, the external interface and so forth in addition to the foregoing construction. Such additionally required components are not directly relevant for the present invention and thus are neglected from illustration and description.

Figure 22:
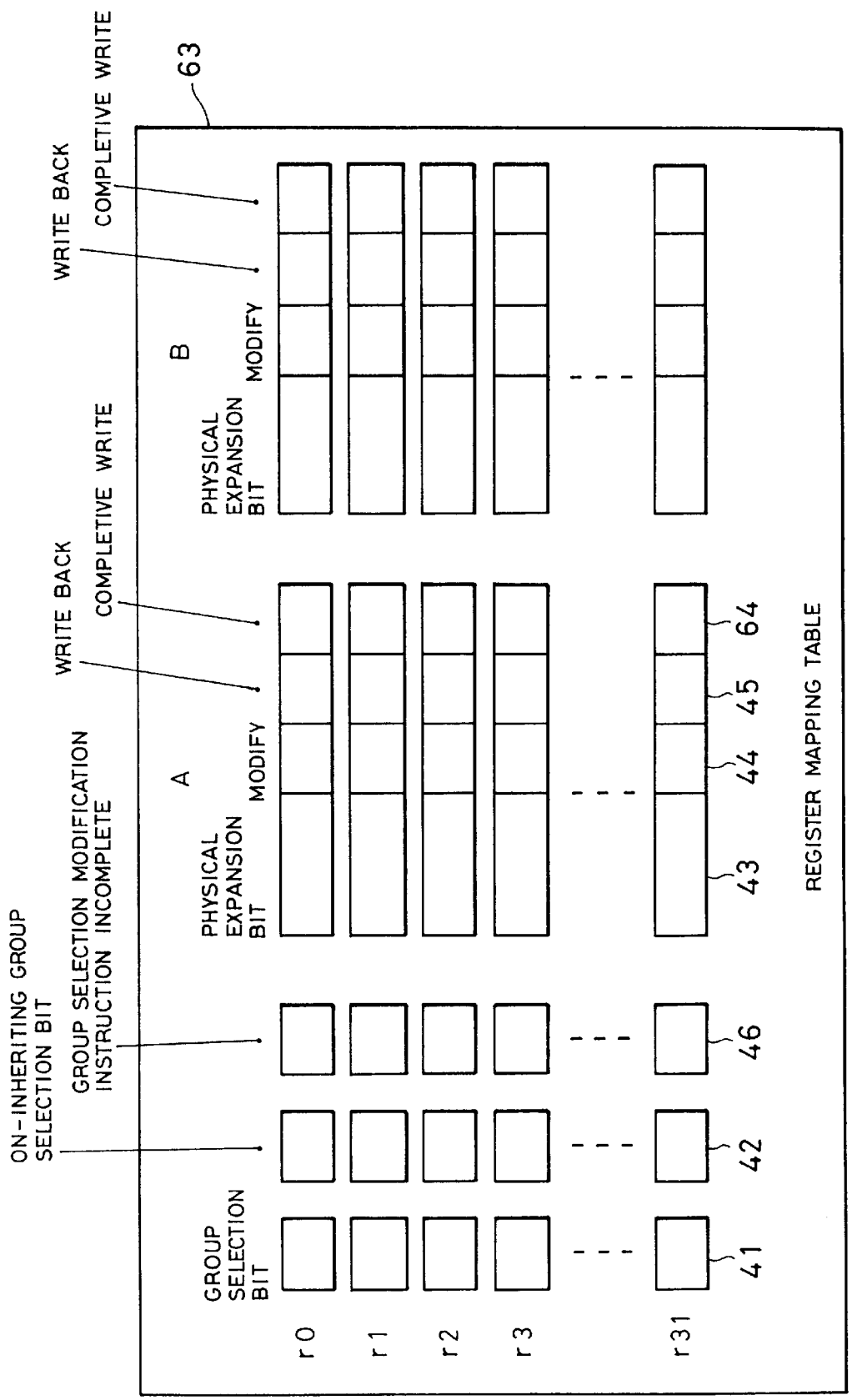
FIG. 22 is an illustration showing a detailed construction of the register mapping table of FIG. 21.
Figure 23:
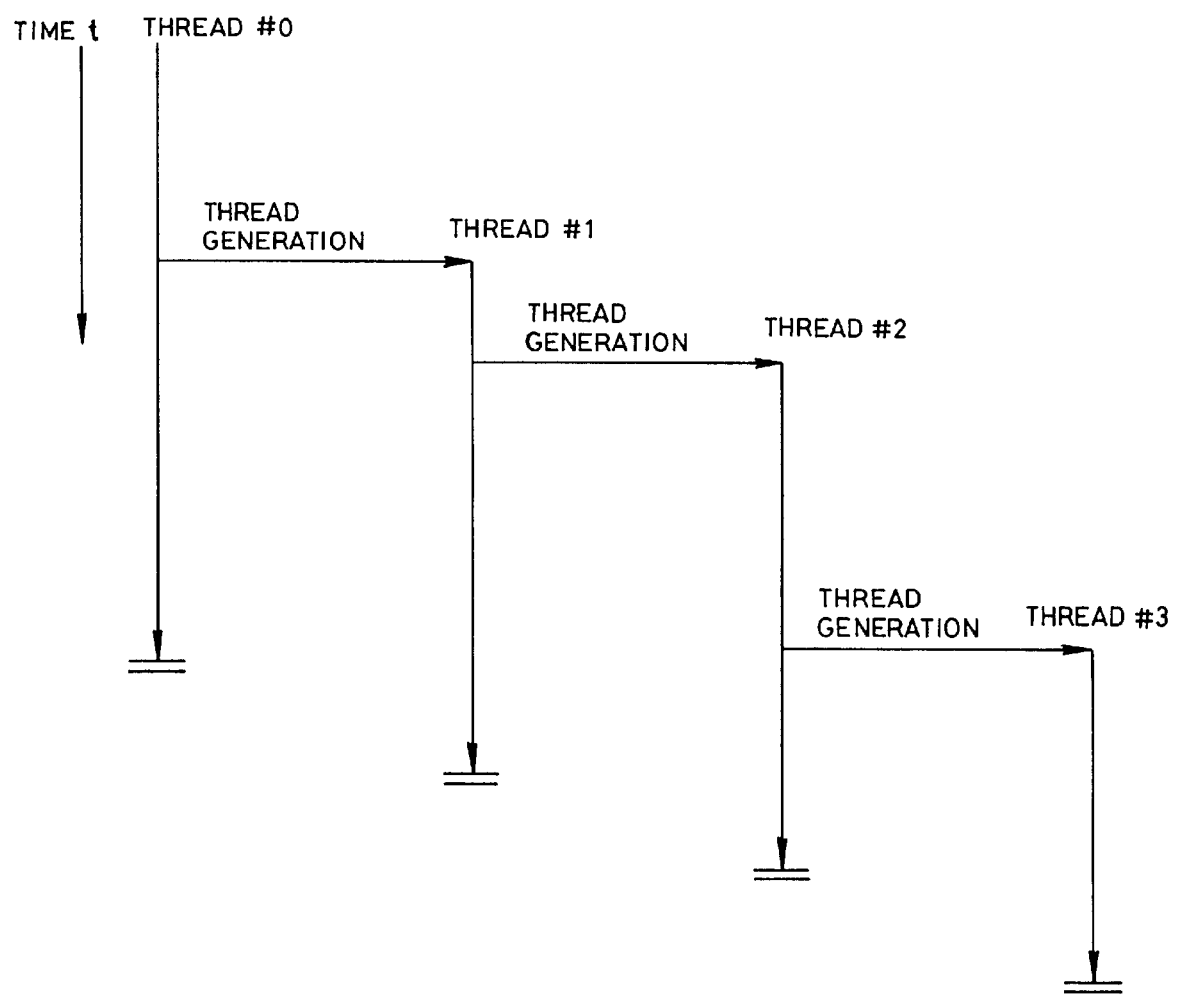
FIG. 23 is an illustration showing a concept of the conventional form one time model.
Figure 24:
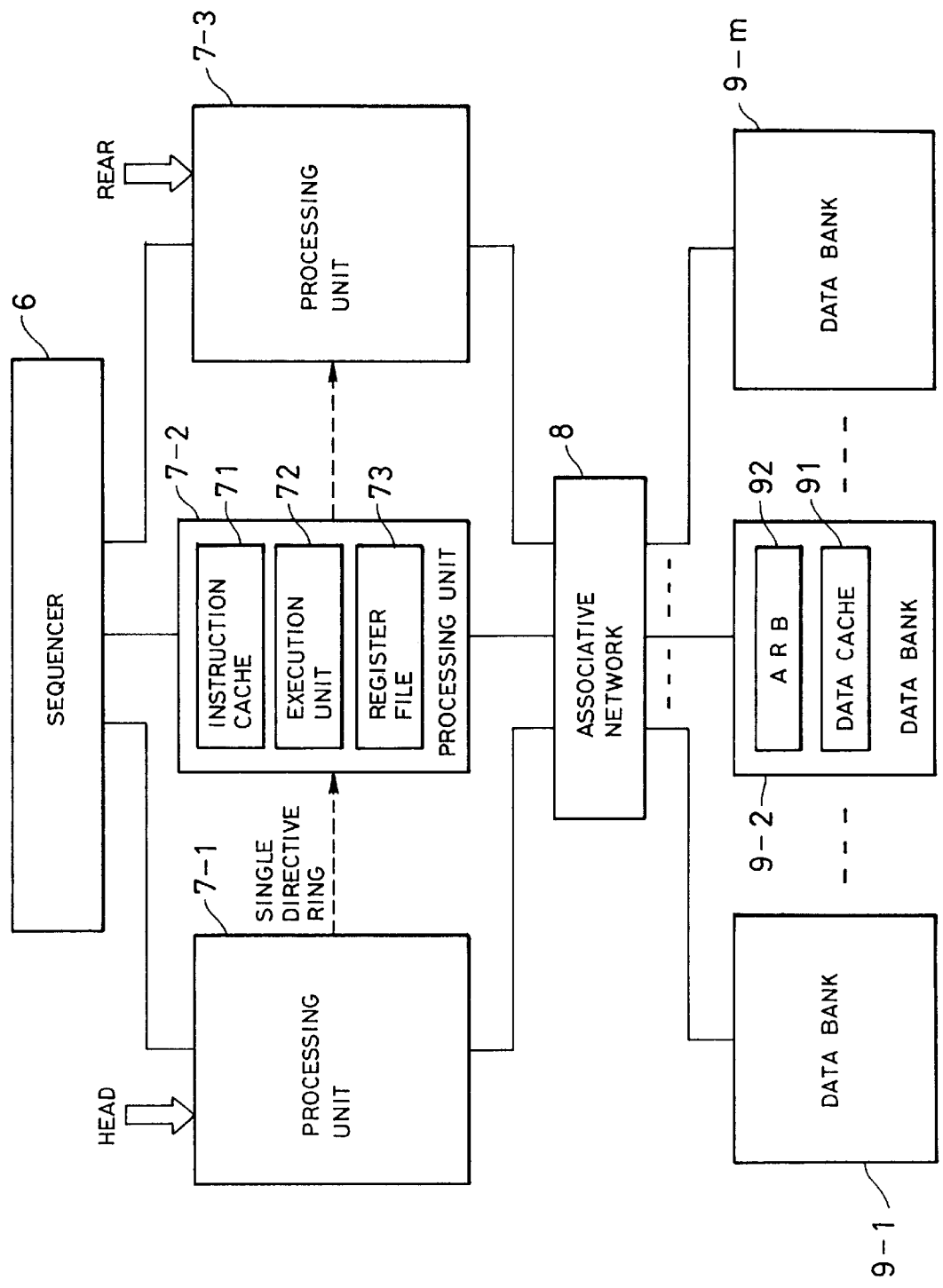
FIG. 24 is a block diagram showing the construction of the conventional multiscalar multi-processor.
Figure 25:
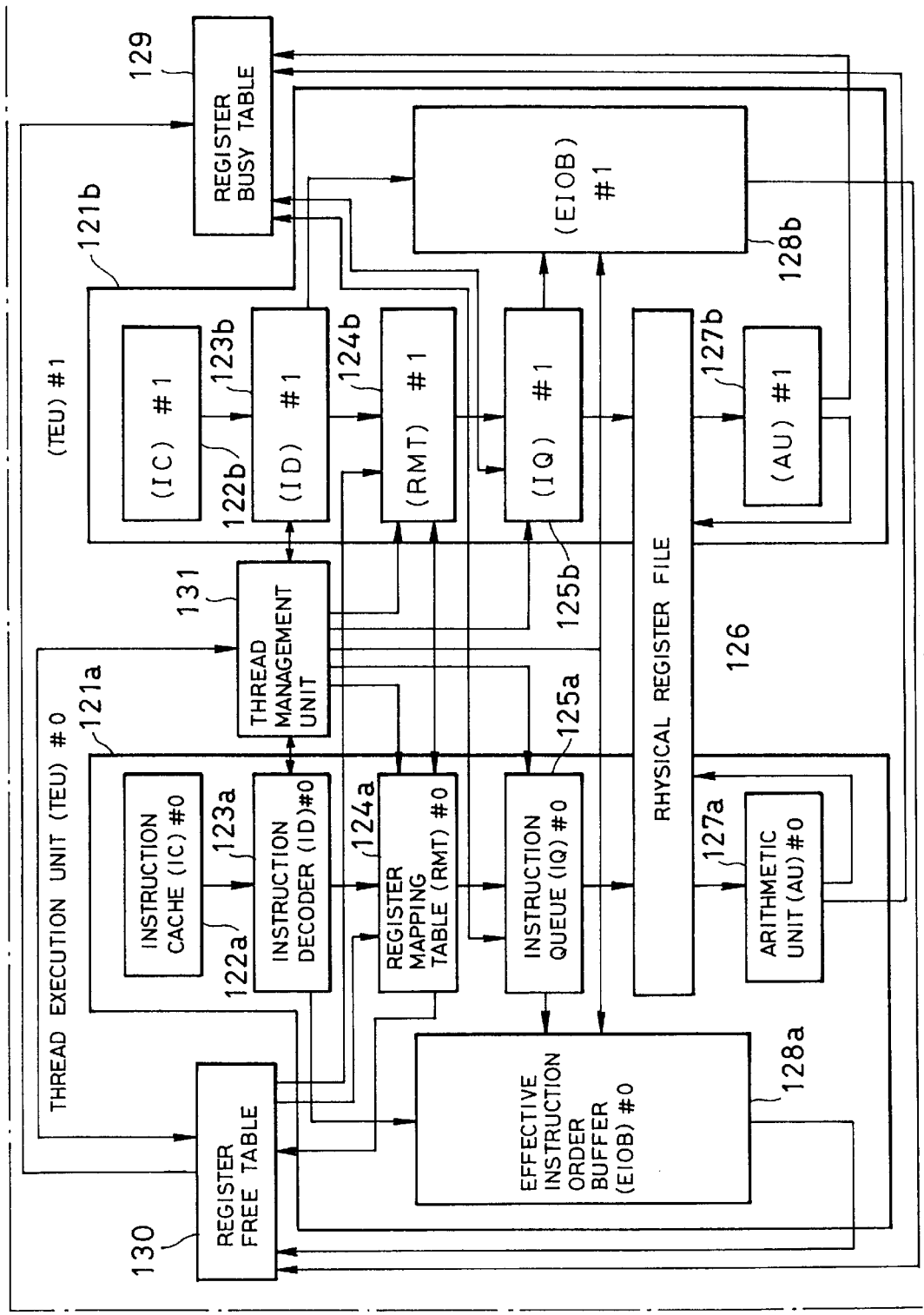
FIG. 25 is an illustration showing a construction of the multithread multi-processor using the conventional register mapping table.
Figure 26:
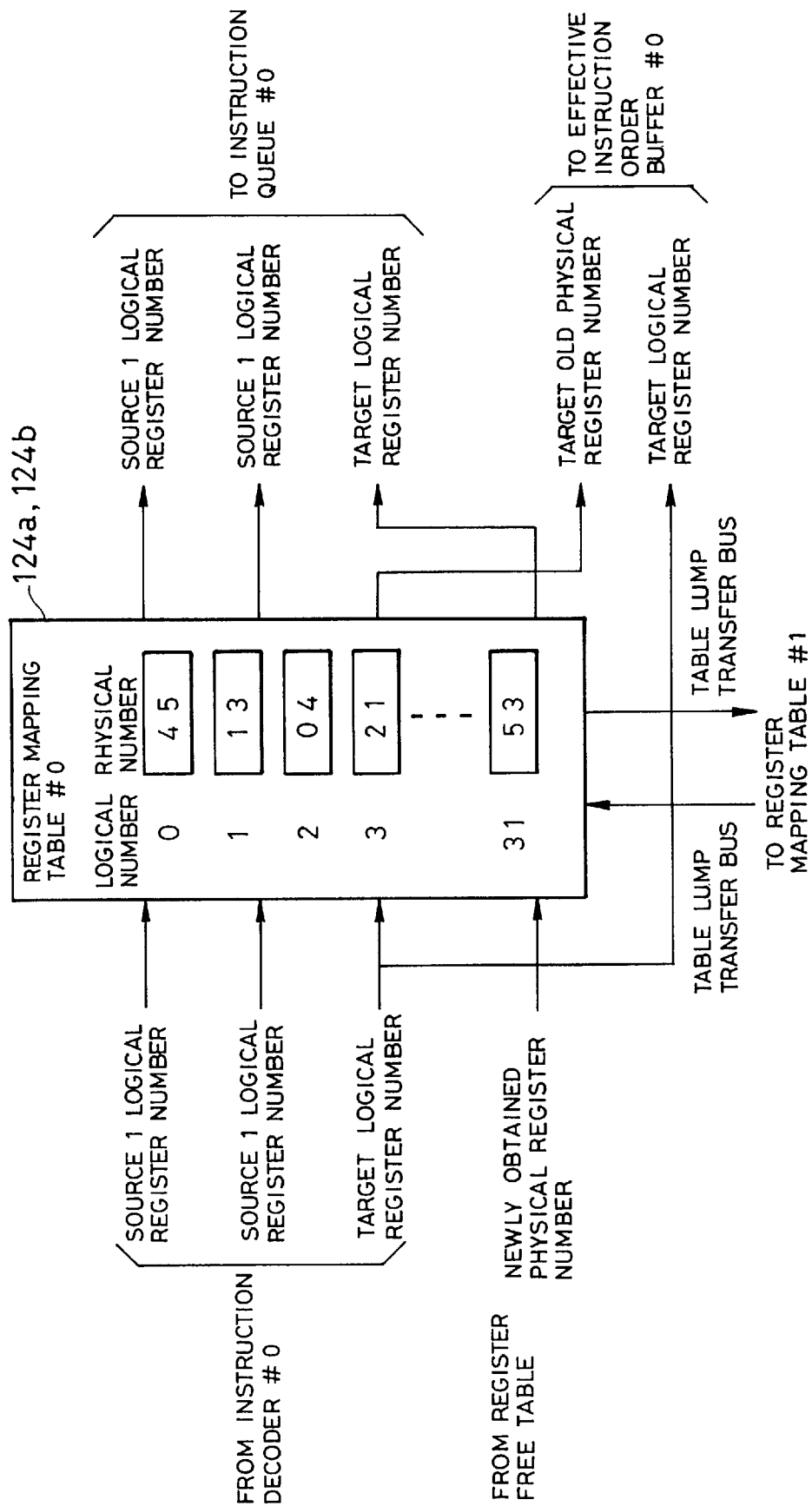
FIG. 26 is a block diagram showing a construction of the register mapping table of the multi-processor of FIG. 24.

FIG. 22 is an illustration showing the detailed construction of the register mapping table 63 of FIG. 21. The register mapping table 63 is similar to the register mapping table shown in FIG. 11 except for the completive write bit 64 as additional component. It should be noted that like components to those in FIG. 11 will be identified by like reference numerals and detailed description therefor will be neglected in order to avoid redundant disclosure for keeping the disclosure simple enough to facilitate clear understanding of the present invention.

In the fourth embodiment of the present invention, the register effectiveness table 62 indicates effective/null of the register value of other thread execution unit. Namely, in the shown case, the register effectiveness table (#0) 62-0 indicates whether the value of the register transferred from the thread executed by the thread execution units (#1 to #3) 1-1 to 1-3 is fixed and thus effective or not yet fixed and thus null (instruction for writing in the relevant register is not yet completed).

On the other hand, in the pipeline stage of the fourth embodiment of the present invention, respective pipeline stage of the thread execution units (#0 to #3) 1-0 to 1-3 is completed through six stages of the instruction fetching stage 31, the instruction decoding stage 32, the register conversion stage 33, the instruction issuing stage 65, the execution stage 34, the register write back stage 35. It should be noted that the instruction issuing queue 61 is inserted between the register conversion stage 33 and the instruction issuing stage 65, the instructions are executed from one ready to issue the instruction following the instruction issuing stage 65, in out-of-order.

The instruction issuing queue 61 performs issuance of instruction in out-of-order from the instruction becoming ready for issue. Therefore, the value of the register to be used by the instruction becoming effective is waited to keep the stand-by state for issuing the instructions from those becoming effective.

In the fourth embodiment of the present invention, by using the instruction issuing queue 61, writing back of the register in-order of the program shown in FIG. 10 is not performed and writing back in out-of-order is performed.

Accordingly, on the side of the thread execution unit (#1) 1-1 in which execution of the new thread is initiated, reading reference has to be restricted as long as the writing back on the side of the thread execution unit (#0) 1-0 in initiation side. In order to performing checking of completion of write back, the register effectiveness table 62 is employed.

The instruction for performing reading reference of certain register determines whether check has to be effected with the register effectiveness table 62 upon issuance of instruction in the register mapping table 63 at the register conversion stage 33, or not.

If the modification bit 44 of the group selected by the group selecting bit 41 of the register mapping table 63is not set, it becomes necessary to check the effective bit 66 upon issuance of instruction. When the modification bit 44 is set, it is unnecessary to check the effective bit 66. The reason is that since writing to the relevant register has already been done in the own thread, judgment can be made that inheriting of register content has been completed between the threads.

In the instruction issuing queue 61, upon checking whether the instruction can be issued or not for the instruction which is judged as checking of the effective bit 66 being necessary, the effective bit 66 of the register effectiveness table 62 is checked. As a result of checking, if null is indicated, such instruction is controlled so as not to be executed until it becomes effective.

In the fourth embodiment of the present invention, the effectiveness determining logic (#0) determines and outputs effective/null of the input with respect to the register effectiveness table (#1) 62-1 on the basis of the values of the register effectiveness table ("0) 62-0 and the register mapping table 63. Hereinafter, method of setting/resetting of the register effectiveness table 62 will be discussed with reference to FIGS. 21, 22 and 17 to 20.

The completive write bit 64 is set simultaneously with the modification bit 44. Upon writing back of the instruction for modifying register, whether the write instruction for the same register by the general instruction up to thread generating instruction is present or not, is judged by comparison of the instruction issuing queue and the instruction present in the execution stage of the pipeline.

If the write instruction is not present, the completive write bit 64 is reset.

Namely, the condition where the modification bit 44 is set and the completive write bit 64 is reset, represents that while the content of the register is rewritten up to thread generation, the value is reflected to the physical common register file 2.

When both of the modification bit 44 and the completive write bit 64 are set, the instruction for rewriting the register is issued until generation of the thread, it represents that the instruction is not completed.

In case of rewriting after fork, rewriting after fork from the on-inherit group selection bit 42 is performed by making judgment of the effectiveness determining logic 67 according to the logic of FIG. 20 to prevent outputting of the erroneous null signal.

The register effectiveness table 62 on the side where the thread is generated, sets the effective bit 66 by the value generated by the effectiveness determining logic 67 on the thread generation side to determine whether instruction can be issued from the instruction issuing queue 61 or not in a manner set forth above.

As set forth above, inheriting of the register content between the threads effectively using the fork one time model becomes possible without requiring data transfer through the common memory and thus permits effective execution of multithread.

On the other hand, inheriting of the content of the register can be realized between before and after the fork instruction without using the common resource other than the register. Therefore, it becomes possible to reduce overhead associating with thread generation, to use sole thread execution units 1-0 to 1-3 in high level, and to realize high speed multithread multi-processor.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

Namely, while the present invention has been discussed in detail in terms of the first to fourth embodiments of the present invention with reference to the accompanying drawings, such particular embodiment should not be taken as limitative for the technical scope of the present invention.

What is claimed is:

1. A register content inheriting system in a multi-processor having a plurality of program counters, each said program counter corresponding to a logical register accessible by software, said multi-processor having a plurality of thread execution units simultaneously fetching, decoding and executing a plurality of threads according to said plurality of program counters, said register content inheriting system comprising:

a physical common register file common between respective of said plurality of thread execution units and comprising a plurality of physical registers;

a conversion mapping table for each of said plurality of thread execution units defining a mapping relationship between each logical register in said thread execution unit and a particular one of said plurality of physical registers in said physical common register file; and a data bus interconnecting said thread execution units for copying information of said conversion table of each of said plurality of thread execution units to an adjacent thread execution unit, wherein said plurality of physical registers is categorized into a plurality of groups to define said mapping relationship for each said logical register, and wherein information indicating said group classification is part of the information of said conversion mapping table for defining said mapping relationship.

2. A register content inheriting system as set forth in claim 1, wherein said group categorization comprises a selected-side group for holding information to be copied and a non-selected-side group for holding information after modification when the information to be copied is modified by said thread execution unit actually executing said thread.

3. A register content inheriting system as set forth in claim 2, wherein the register belonging in said non-selected-side group is taken as the register of the next stage to be used in said non-selected-side group.

4. A register content inheriting system as set forth in claim 2, wherein information indicative of whether a selection modification instruction is complete for said selected-side group and said non-selected-side group, and upon making judgment that said selection modification instruction is to be canceled, the selected condition of said group is returned to the condition before execution of said selection modification instruction.

5. A register content inheriting system as set forth in claim 1, which further comprises an effectiveness table indicative of an effective/null status of the transferred register content, and upon making reference to the transferred register content, making reference is performed after confirming that the transferred register content is effective on the basis of the content of the effectiveness table.

6. A register content inheriting system as set forth in claim 5, wherein said effectiveness table stores effective/null status of the transferred register content as judged on the basis of whether the transferred register content has been updated in the physical common register file.

7. A register content inheriting system as set forth in claim 5, wherein said effective/null status of said effectiveness table within a first thread execution unit determines a status of said effectiveness table of a next thread execution unit and outputs a status based on the content of said conversion table of said first thread execution unit and the content of said effectiveness table of said next thread execution unit.

8. A register content inheriting system as set forth in claim 1, wherein each said thread execution unit further comprises an instruction issuing queue holding at least one instruction of said plurality of threads and issuing said at least one instruction when said at least one instruction is determined to be effective.

9. A register content inheriting system as set forth in claim 1, wherein said plurality of physical registers in said physical common register file comprises a first number of physical registers, said first number being double the number of said plurality of thread execution units times the number of said logical registers.

10. A register content inheriting system as set forth in claim 9, wherein said physical common register file further comprises a physical-expansion-bits information, said information having a number of bits sufficient to identify uniquely one of said number of said plurality of thread execution units.

11. A register content inheriting system as set forth in claim 1, wherein each said physical register further comprises:

a physical expansion bit field designating a unique one of said plurality of thread execution units;

a group selection bit field categorizing said physical register into one of a set of possible groups; and a logical register number bit field identifying said physical register as being associated with a specific logical register.

12. A register content inheriting system as set forth in claim 1, wherein said conversion table includes a group selection bit per each said logical register, said group selection bit indicating which group of said physical registers said thread execution unit is mapped to, a physical expansion bit field indicating which of the physical registers in the group is to be made reference to, a modification bit indicating whether the instruction for updating said physical register selected by said group selection bit is decoded for at least one time, wherein said physical expansion bit field and said modification bit are provided per each said group.

13. A register content inheriting system as set forth in claim 12, wherein said conversion mapping table further includes a write back bit indicating whether at least one instruction for updating the physical register is completed, wherein said write back bit is provided per each said group.

14. A register content inheriting system as set forth in claim 13, wherein said conversion mapping table further includes an on-inheriting group selection bit storing a copy of the content of said group selection bit at a timing where the register content is transferred from one thread execution unit to another thread execution unit.

15. A register content inheriting system as set forth in claim 12, wherein said conversion mapping table further includes a group selection modification instruction in completion bit which is set when the instruction for modifying said group selection bit passes through a register conversion stage and reset at a timing where said instruction reaches a register write back stage.

16. A register content inheriting system as set forth in claim 12, wherein said conversion mapping table further includes a completive write bit indicating whether a write instruction for the same register in general instruction up to thread generation instruction or not.

* * * * *